(12) United States Patent
Di Carlo et al.

(10) Patent No.: US 10,830,374 B2
(45) Date of Patent: Nov. 10, 2020

(54) BIASING CRYOGENIC FEEDLINE INSTALLATIONS TO ELIMINATE BRAIDED HOSE DISTORTIONS AND EXTEND USEFUL LIFE OF BRAIDED HOSES

(71) Applicant: THE BOEING COMPANY, Chicago, IL (US)

(72) Inventors: Tony Di Carlo, Long Beach, CA (US); Richard Topf, Orange, CA (US)

(73) Assignee: THE BOEING COMPANY, Chicago, IL (US)

( * ) Notice: Subject to any disclaimer, the term of this patent is extended or adjusted under 35 U.S.C. 154(b) by 140 days.

(21) Appl. No.: 15/941,629

(22) Filed: Mar. 30, 2018

(65) Prior Publication Data
US 2019/0301642 A1  Oct. 3, 2019

(51) Int. Cl.
| B23P 19/00 | (2006.01) |
| F16L 3/10 | (2006.01) |
| F16L 59/153 | (2006.01) |
| F16L 59/14 | (2006.01) |

(52) U.S. Cl.
CPC ............. *F16L 3/105* (2013.01); *F16L 59/141* (2013.01); *F16L 59/153* (2013.01)

(58) Field of Classification Search
CPC ........... B23P 19/00; B23P 19/10; B23P 19/04; B23Q 1/00; B23Q 1/25; B23Q 3/00; F22B 3/105; F22B 59/141
See application file for complete search history.

(56) References Cited

U.S. PATENT DOCUMENTS

| 3,400,872 | A | * | 9/1968 | Rogers | ............... B23K 37/0533 228/44.5 |
| 3,711,920 | A | * | 1/1973 | Simmons, Jr. | ...... B23K 37/0533 29/256 |
| 4,769,889 | A | * | 9/1988 | Landman | ................. B25B 27/10 29/237 |
| 5,052,608 | A | * | 10/1991 | McClure | ............ B23K 37/0533 228/44.5 |
| 5,727,778 | A | * | 3/1998 | Nodar | ...................... B25B 1/205 269/296 |
| 6,561,714 | B1 | * | 5/2003 | Williams | ............... F16L 23/036 166/364 |
| 9,687,941 | B2 | * | 6/2017 | McClure | ............ B23K 37/0533 |
| 9,808,893 | B2 | * | 11/2017 | McClure | ............ B23K 37/0533 |
| 2003/0106968 | A1 | * | 6/2003 | Terrill | ...................... B25B 27/10 248/58 |
| 2015/0165672 | A1 | * | 6/2015 | Montgomery | ...... B29C 65/7802 156/272.2 |
| 2019/0301642 | A1 | * | 10/2019 | Di Carlo | ................. F16L 3/105 |

* cited by examiner

*Primary Examiner* — Lee D Wilson
(74) *Attorney, Agent, or Firm* — Patterson + Sheridan, LLP

(57) ABSTRACT

The present disclosure relates to the construction and use of feedlines in temperature-biased systems that include counter-biased hoses. The alignment and installation/uninstallation of the counter-biased hoses is enabled by a biasing tool with at least a first yoke having a first rotation point and a second rotation point, a second yoke having a third rotation point and a fourth rotation point, a first rod assembly connected to the first yoke at the first rotation point and connected to the second yoke at the fourth rotation point, and a second rod assembly connected to the first yoke at the second rotation point and connected to the second yoke at the third rotation point.

20 Claims, 16 Drawing Sheets

BIASING CRYOGENIC FEEDLINE INSTALLATIONS TO ELIMINATE BRAIDED HOSE DISTORTIONS AND EXTEND USEFUL LIFE OF BRAIDED HOSES

GOVERNMENT LICENSE RIGHTS

This invention was made with government support under HR0011-17-9-001 awarded by Defense Advanced Research Projects Agency. The government has certain rights in the invention.

FIELD

Aspects of the present disclosure provide an apparatus and methods of use therefore for installing braided hoses in biased feedlines.

BACKGROUND

The present disclosure relates to installing hoses, and more specifically, to the installation of braided hoses in temperature-biased cryogenic feedlines. As will be appreciated, materials expand and contract as temperatures of the materials increase and decrease. Generally, a component expands when heated and contracts when cooled. Cryogenic materials, which include liquid Oxygen (LOX) and liquid Hydrogen (LH2), can cool the components used to transport or store the cryogenic materials from the ambient temperatures at which those components were installed at or are used at, which can drastically affect how separate components are mated together based on installation and operational temperatures of the components.

SUMMARY

The present disclosure provides a biasing tool in one embodiment, the biasing tool including: a first yoke having a first rotation point and a second rotation point; a second yoke having a third rotation point and a fourth rotation point; a first rod assembly connected to the first yoke at the first rotation point and connected to the second yoke at the fourth rotation point, the first rod assembly having a first length; a second rod assembly connected to the first yoke at the second rotation point and connected to the second yoke at the third rotation point, the second rod assembly having a second length independent from the first length; wherein the first rod assembly crosses the second rod assembly.

In one aspect, in combination with any example biasing tool above or below, the biasing tool includes a third yoke having a fifth rotation point and a sixth rotation point; a fourth yoke having a seventh rotation point and an eighth rotation point; a third rod assembly connected to the third yoke at the fifth rotation point and connected to the fourth yoke at the eighth rotation point, the third rod assembly having a third length; a fourth rod assembly connected to the third yoke at the sixth rotation point and connected to the fourth yoke at the seventh rotation point, the fourth rod assembly having a fourth length; wherein the third yoke is matched with the first yoke to form a first collar; wherein the fourth yoke is matched with the second yoke to form a second collar; wherein the third rod assembly is parallel to the first rod assembly and the third length is matched to the first length; and wherein the fourth rod assembly is parallel to the second rod assembly and the fourth length is matched to the second length.

In one aspect, in combination with any example biasing tool above or below, the biasing tool is arranged such that the first collar has a first latch on a first side of the biasing tool and a first hinge on a second side of the biasing tool opposite to the first side; and the second collar has a second latch on the first side and a second hinge on the second side.

In one aspect, in combination with any example biasing tool above or below, the biasing tool is arranged such that the first collar has a first latch on a first side of the biasing tool and a second latch on a second side of the biasing tool opposite to the first side; and the second collar has a third latch on the first side and a fourth latch on the second side.

In one aspect, in combination with any example biasing tool above or below, the first collar defines a first through-hole in a first plane; and the second collar defines a second through-hole in a second plane parallel to the first plane.

In one aspect, in combination with any example biasing tool above or below, the first length and the third length are adjustable to laterally bias a hose captured in the first through-hole and the second through-hole.

In one aspect, in combination with any example biasing tool above or below, the second length and the fourth length are adjustable to longitudinally bias the hose captured in the first through-hole and the second through-hole.

In one aspect, in combination with any example biasing tool above or below, the biasing tool includes a third yoke having a fifth rotation point and a sixth rotation point; a fourth yoke having a seventh rotation point and an eighth rotation point on an opposite surface from the third rotation point and the fourth rotation point; a third rod assembly connected to the third yoke at the fifth rotation point and connected to the fourth yoke at the seventh rotation point; a fourth rod assembly connected to the third yoke at the sixth rotation point and connected to the fourth yoke at the eighth rotation point in parallel to the third rod assembly, the fourth rod assembly having a fourth adjustable length; wherein the third yoke is matched with the first yoke to form a first collar; and wherein the fourth yoke is matched with the second yoke to form a second collar.

In one aspect, in combination with any example biasing tool above or below, the first rotation point and the fourth rotation point contain movement of the first rod assembly to rotation in a first plane, and wherein the second rotation point and the third rotation point contain movement of the second rod assembly to rotation in a second plane parallel to the first plane.

In one aspect, in combination with any example biasing tool above or below, the first yoke includes a first hose grip, and wherein the second yoke includes a second hose grip.

In one aspect, in combination with any example biasing tool above or below, the biasing tool includes a first sliding yoke connected via a first sliding lug to the first yoke to selectively slide laterally relative to the first yoke, wherein the first sliding lug selectively secures the first sliding yoke to the first yoke to restrict movement of the first sliding yoke; and a second sliding yoke connected via a second sliding lug to the second yoke to selectively slide laterally relative to the second yoke, wherein the second sliding lug selectively secures the second sliding yoke to the second yoke to restrict movement of the second sliding yoke.

In one aspect, in combination with any example biasing tool above or below, the biasing tool includes a first mobile yoke connected via a first pivot to the first yoke; a first height lug disposed of in the first yoke in contact with the first mobile yoke, configured to affect a height of a portion of the first mobile yoke relative to the first yoke; a second mobile yoke connected via a second pivot to the second yoke; and a second height lug disposed of in the second yoke in contact with the second mobile yoke, configured to affect a height of a portion of the second mobile yoke relative to the second yoke.

In another embodiment, a biasing tool is provided that includes a first turnbuckle having a first end and a second end; a second turnbuckle having a first end and a second end; a first collar defining a first through-hole in a first plane and including a first rotation point that rotates in a second plane and a second rotation point rotates in a third plane, wherein the second plane and the third plane are perpendicular to the first plane; a second collar defining a second through-hole in a fourth plane parallel to the first plane and including a third rotation point that rotates in the second plane and a fourth rotation point that rotates in the third plane; wherein the first end of the first turnbuckle is connected to the first rotation point; wherein the second end of the first turnbuckle is connected to the second rotation point; wherein the first end of the second turnbuckle is connected to the third rotation point; wherein the second end of the second turnbuckle is connected to the fourth rotation point; and wherein the first turnbuckle crosses the second turnbuckle.

In one aspect, in combination with any example biasing tool above or below, the first collar further includes a fifth rotation point that rotates in a fifth plane and a sixth rotation point rotates in a sixth plane, wherein the fifth plane and the sixth plane are perpendicular to the first plane; the second collar further includes a seventh rotation point that rotates in the sixth plane and an eighth rotation point rotates in the fifth plane; a third turnbuckle that has a first end connected to the fifth rotation point and a second end connected to the eighth rotation point, parallel to the first turnbuckle; a fourth turnbuckle that has a first end connected to the sixth rotation point and a second end connected to the seventh rotation point, parallel to the second turnbuckle.

In one aspect, in combination with any example biasing tool above or below, the first collar further includes a first yoke, a second yoke, and a first latch, the first yoke defining a first portion of the first through-hole and the second yoke defining a second portion of the first through-hole, the first latch securing the first yoke with the second yoke; and the second collar further includes a third yoke, a fourth yoke, and a second latch, the third yoke defining a first portion of the second through-hole and the second yoke defining a second portion of the second through-hole, the first latch securing the third yoke with the fourth yoke.

In a further embodiment a method is provided for biasing cryogenic feedline installations to eliminate braided hose distortions and extend useful life of braided hoses including: determining a bias for a pipe join from an installed position to an operational position; attaching a biasing tool to a hose; biasing the hose via the biasing tool to match the bias determined for the pipe join; installing the hose at the pipe join; and removing the biasing tool.

In one aspect, in combination with any example above or below, the biasing tool is attached to the hose via a first collar at a first end of the hose and via a second collar at the second end of the hose, wherein the first collar is connected to the second collar by at least a first rod assembly and a second rod assembly, and the first rod assembly and the second rod assembly cross.

In one aspect, in combination with any example above or below, biasing the hose via the biasing tool includes: unevenly adjusting a first length of the first rod assembly in relation to a second length of the second rod assembly to affect a lateral bias in the hose.

In one aspect, in combination with any example above or below, biasing the hose via the biasing tool includes: evenly adjusting a first length the first rod assembly in relation to a second length of the second rod assembly to affect a vertical bias in the hose.

In one aspect, in combination with any example above or below, the biasing tool further comprises a third rod assembly and a fourth rod assembly, wherein the third rod assembly is connected to the first collar and the second collar at an opposite side of the biasing tool from the first rod assembly in parallel with the first rod assembly, wherein the fourth rod assembly is connected to the first collar and the second collar at the opposite side of the biasing tool from the second rod assembly in parallel with the second rod assembly, wherein the first rod assembly and the third rod assembly are concurrently adjusted and the second rod assembly and the fourth rod assembly are concurrently adjusted to affect the bias in the hose.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

The present disclosure relates to an apparatus and methods of use thereof to facilitate the installation of braided hoses in temperature-biased systems and installations. Although reference is made herein to examples of a temperature-biased systems in reusable launch vehicles (e.g., rockets), one of ordinary skill in the art will appreciate that these examples do not limit the applicability of the present disclosure.

In a temperature-biased system, the various piping and storage vessels for a material are installed at a first state and will expand or contract into a second state based on temperature changes and the coefficients of thermal expansions for the material used. In systems with wide temperature ranges between the first and second states, the expansion and contraction of the piping and vessels used therein cannot be accounted for with the flexibility of the piping alone; various expansion joints are used in long runs of the piping, and gimballed joints are used to account for turns or angled sections of piping. These solutions are bulky, heavy, and prone to leaking the material being transported, which renders these solutions non-ideal for use in launch systems.

A temperature-biased system that uses braided hoses in place of expansion joints and/or gimballed joints can solve several of the difficulties associated with heavy and bulky equipment used in prior solutions. The braided hoses allow for axial, lateral, and rotational deflection to accommodate thermal expansion or contraction in the piping and the materials comprising the hoses. Although the braided hoses are more flexible than the rigid piping and vessels to which the hoses are mated, the braided hoses are often quite rigid and require great force to deflect into a desired shape. Installing the braided hoses with more rigid portions of the temperature-biased system can therefore be difficult.

An apparatus and method of use therefore are described in the present disclosure that improve the installation of braided hoses into temperature-biased systems. The apparatus is used as a biasing tool that captures two ends of a braided hose and imparts a bias in the hose that is held until the hose can be installed in a temperature-biased system and the biasing tool removed from the hose. A user of the biasing tool is able to finely control how far the braided hose is deflected from its resting state, and to maintain the braided hose in the desired position for installation, thus enabling an easier installation of braided-hoses into temperature-biased systems. Similarly, the biasing tool may be employed to ease uninstalling braided hoses in temperature-biased systems; allowing a user to slowly return a biased hose to a resting state without the "snapping" or "rubber-banding" associated with a rapid return to a resting state.

Figure 1A:
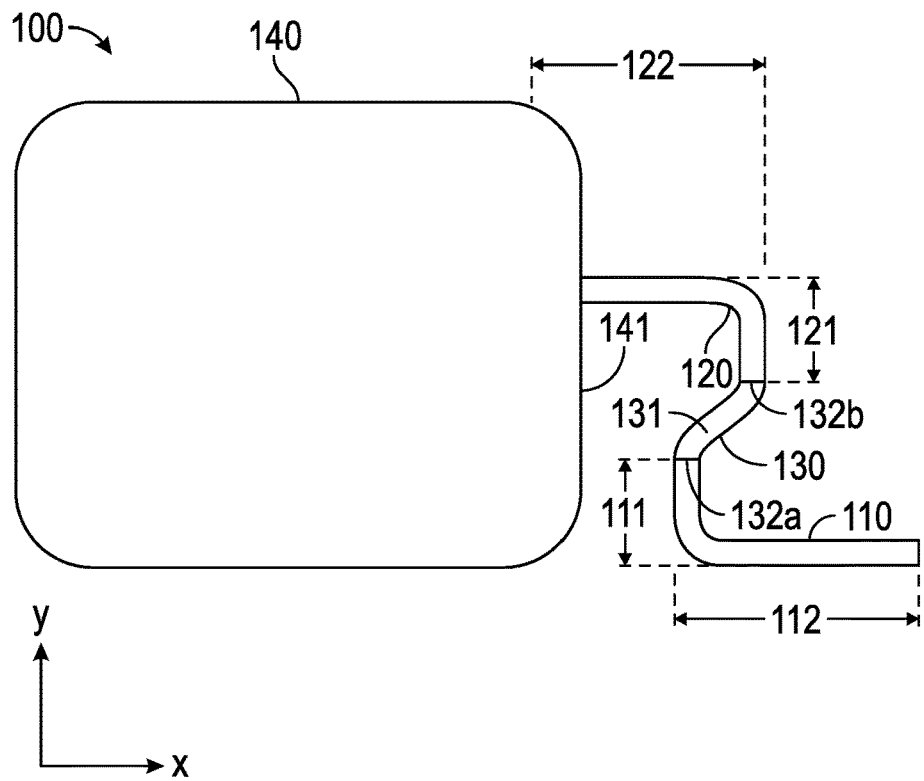
FIG. 1A illustrates an example temperature-biased system in an installation state according to embodiments of the present disclosure.
Figure 1B:
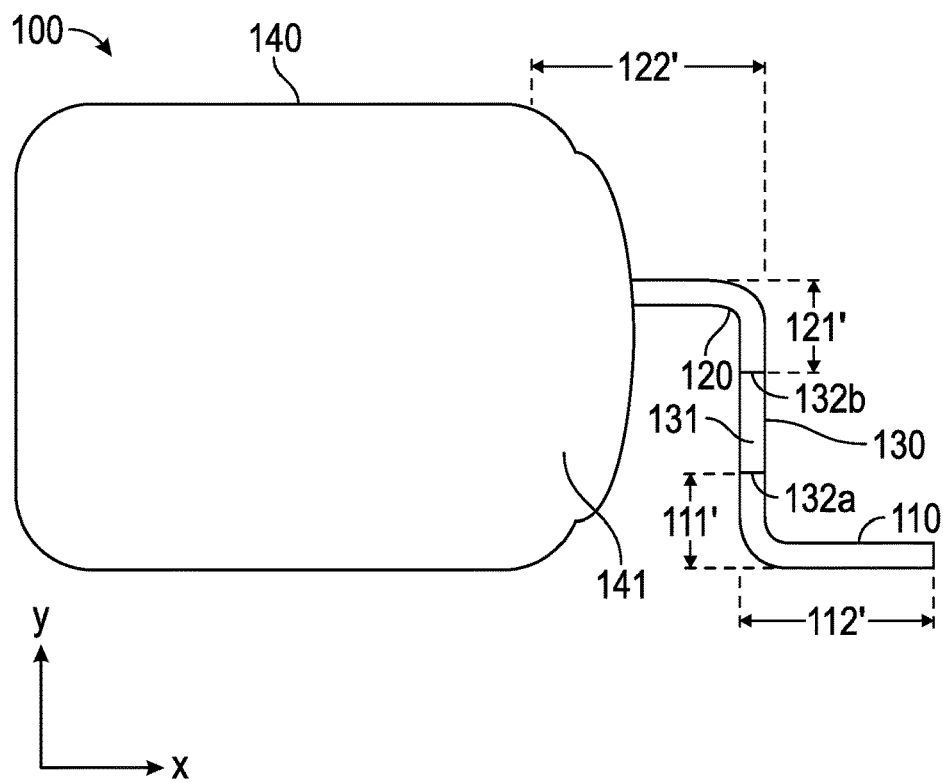
FIG. 1B illustrates an example temperature-biased system in an operation state according to embodiments of the present disclosure.

Turning now to FIG. 1A, an example temperature-biased system 100 is shown in an installation state. FIG. 2B illustrates the example temperature-biased system 100 in an operational state. The illustrated examples show a system that is generally cooled from its installation state to its operational state, but it will be appreciated that several intermediate states (e.g., "charging", "warm-up", "cool-down") may exist between the illustrated statuses of the example temperature-biased system 100 in which the illustrated components have expanded or contracted differently than is shown in FIGS. 1A and 1B. Similarly, several states beyond those illustrated in FIGS. 1A and 1B (e.g., "over-heated", "over-cooled", "test") may also exist. It will therefore be understood that FIGS. 1A and 1B are provided for explanatory purposes, and that more or fewer elements having different arrangements and temperature effects are contemplated by the present disclosure.

In the example temperature-biased system 100, a first pipe 110 is connected to a second pipe 120 via a hose 130. The first pipe 110 is connected to other parts of the temperature-biased system 100 that are not illustrated, and the second pipe 120 is connected to a storage tank 140. The direction of flow through the first pipe 110, second pipe 120, and the hose 130 may be unidirectional (feeding into the storage tank 140 or feeding out of the storage tank 140) or bidirectional (in turn feeding into and feeding out of the storage tank 140).

In the installation state, illustrated in FIG. 1A, the components do not carry cryogenic fluids, and are held at a first temperature (e.g., from about −20° C. to about 70° C.) so that components may be installed, repairs may be made, and inspections can take place. During an operational state, illustrated in FIG. 1B, the components are carrying cryogenic fluids that chill the components to a second temperature that is lower than the first temperature (e.g., below −100° C.), thus causing the components to contract relative to the size of the components in the installation state. To account for this contraction from the installation state to the operational state (and the expansion from the operation state to the installation state), the first pipe 110 and the second pipe 120 are biased relative to one another in the installation state, and contract into unbiased positions relative to one another in the operation state. As will be appreciated, the unbiased positions place the first pipe 110 and the second pipe 120 in line with one another based on the chilled dimensions of the pipes, whereas the biased positions of the first pipe 110 and the second pipe 120 place the pipes out of line with one another.

The hose 130 connects the first pipe 110 with the second pipe 120 in both the installation state and the operational state. The hose 130 is pre-biased counter to the bias of the first pipe 110 relative to the second pipe 120 in an installation state such that, in the operation state, the hose 130 is held in an unbiased or neutral position. The neutral position is the position of the hose 130 that allows the hose 130 to withstand the greatest stresses before failing (e.g., leaking, ripping). For example, a rocket launch vehicle using cryogenic liquid fuels (e.g., LOX and LH2) will produce tremendous strain on the pipes and hoses used to deliver the fuels to the ignition point during launch operations due to air resistance, cavitation in the engine, the forces of acceleration acting on the components, resonances in fluid flow and ignition, etc., that a hose 130 will need to withstand. The counter-bias placed on the hose 130, therefore, may stretch or compress the hose 130 along a longitudinal axis thereof (i.e., longitudinal biasing), deflect one endpoint of the hose 130 laterally in reference to another endpoint (i.e., lateral biasing), or both so that when in the operational state, the hose 130 experiences minimal (if any) lateral or longitudinal stresses due to the connection of the hose 130 with the first pipe 110 and the second pipe 120. As will be appreciated, stresses from the internal pressure exerted by the fluids on the walls of the hose 130, the cooling effects of the fluid on the hose 130 itself, and the effects of other nearby components may be factored into how the hose 130 is selected and biased for installation.

As discussed in the examples herein, the first pipe 110, the second pipe 120, the hose 130, and the storage tank 140 are configured or operable to carry cryogenic fluids in the operational state, thus cooling and contracting the components relative to the installation state. To discuss the changes in lengths and heights of the various components as the dimensions of the components are affected by various temperatures, the illustrated lengths are used, but it will be understood that the centers of mass, nearby components, surface features, and insulation may affect the actual expansion and contraction of the first pipe 110, the second pipe 120, the hose 130, and the storage tank 140. It will also be understood that various shared or individual reference points may be used to describe the expansion and contraction of the components in addition to or instead of the references discussed herein.

The first pipe 110 is illustrated as an "L" bend, having a first height 111 and a first length 112 in the installation state, which changes to a first height 111' and a first length 112' in the operational state that are smaller than their previous dimensions. The second pipe 120 is also illustrated as an "L" bend, having a second height 121 and a second length 122 in the installation state, which changes to a second height 121' and a second length 122' in the operational state that are smaller than the previous dimensions for the second pipe 120. As will also be appreciated, the diameter of the pipes, the radius of any curvature or bend in the pipes, and the dimensions of any hardware or weld used to bond the pipes will also be affected by the reduction in temperature.

The storage tank 140 may also affect the positioning of the attached second pipe 120 relative to the first pipe 110. For example, the storage tank 140 will also contract when chilled with a cryogenic liquid, but a surface 141 of the storage tank 140, to which the second pipe 120 is connected, may bulge when storing a pressurized cryogenic fluid. It will therefore be appreciated that the effects of the operational state with respect to positioning the opening of the first pipe 110 in line with the opening of the second pipe 120 will need to take into account effects imparted by connected components in the operational state (such as the illustrated storage tank 140) in addition and in combination with the thermal effects on the pipes themselves.

The hose 130, which is flexible, connects the first pipe 110 with the second pipe 120. Because the hose 130 is flexible, the hose 130 is able to expand and contract between the installation state and the operational state. In various embodiments, the body 131 of the hose 130 is made of a braided material that allows for lateral and longitudinal movement of the hose 130. For example, a metal or textile may be overlapped and braided to form a body 131 of a hose 130. The body 131 of the hose 130 defines a duct through which the cryogenic fluid will flow when the system 100 is in the operational state, and terminates at a first end and at a second end with a respective first mounting segment 132*a*, and second mounting segment 132*b* (e.g., flanges) that are used to mount the hose 130 to the first pipe 110 and the second pipe 120. The mounting segments 132 of the hose 130 may be made of a non-braided material that is matched to the coefficient of thermal expansion of the corresponding flanges or mounting segments of the pipes. The material used to form the body 131 of a hose 130 may be the same material used to construct the first pipe 110 and/or the second pipe 120 or may be a different material.

Although the hose 130 is referred to herein as "flexible", the flexibility of the hose 130 is relative to that of the pipes. It will therefore be appreciated that manipulating the hose 130 from a resting state to a counter-biased position for installation in the temperature-biased system 100 may take significant effort, which the hose 130 will resist; attempting to return to the resting state. Therefore, an apparatus is discussed herein to aid in setting and maintaining the precise and controlled counter-biasing of the hose 130 for installation in and uninstallation from the temperature-biased system 100.

Figure 2A:
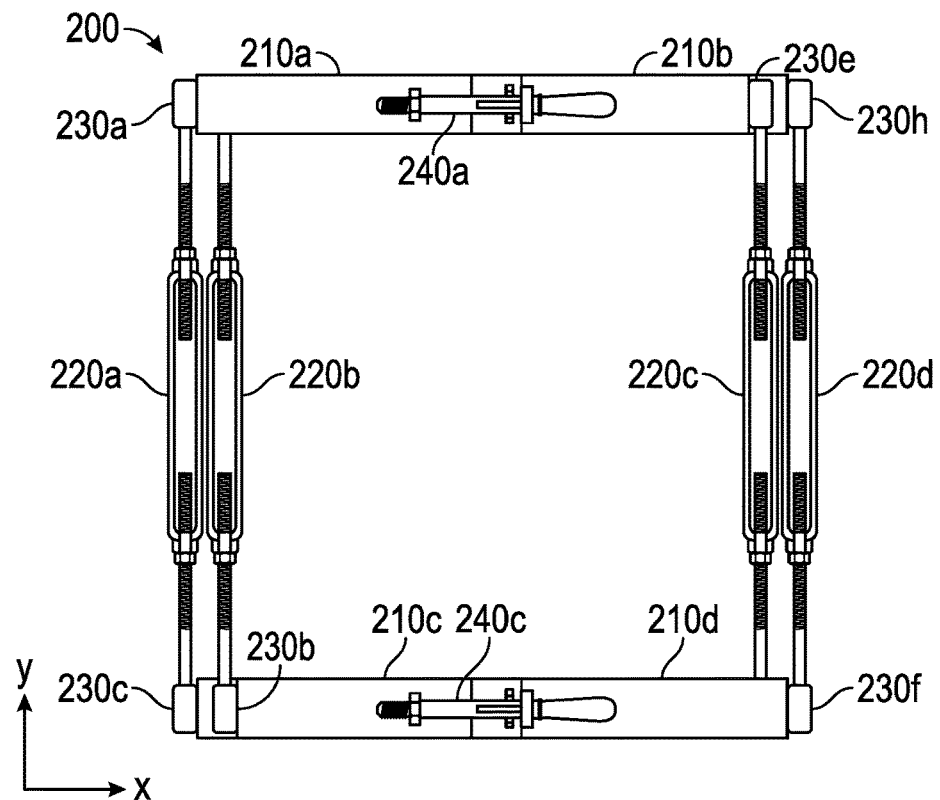
FIGS. 2A-F illustrate various views of a biasing tool according to embodiments of the present disclosure.
Figure 2B:
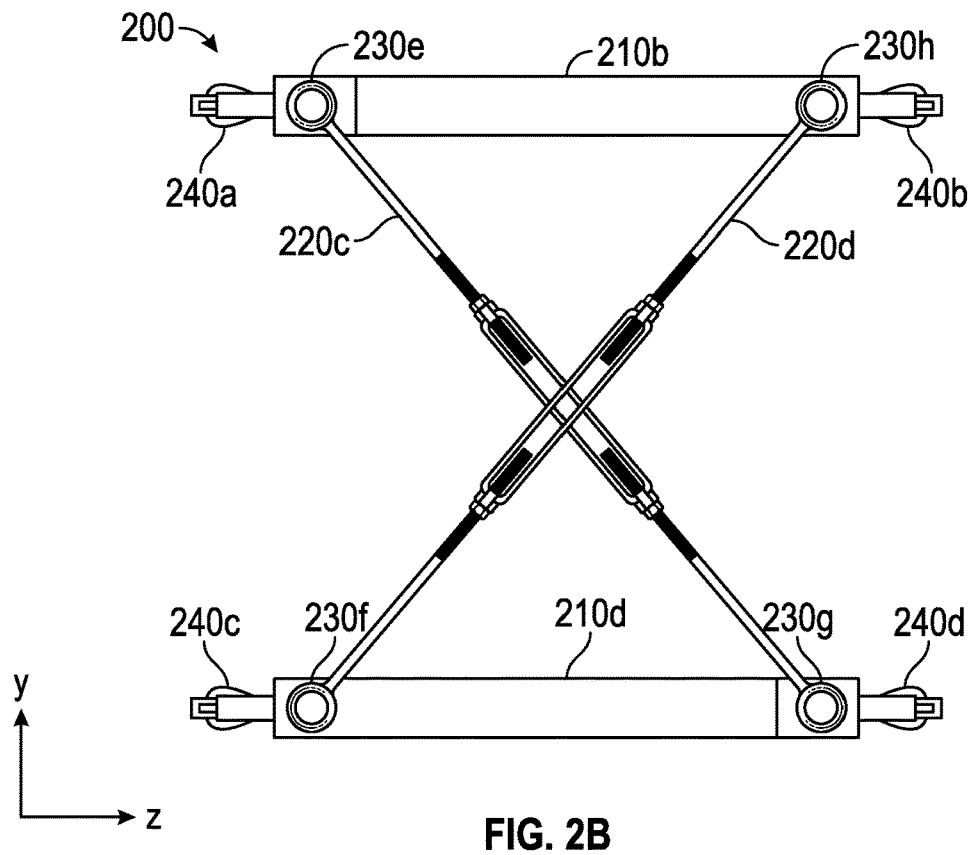
Figure 2C:
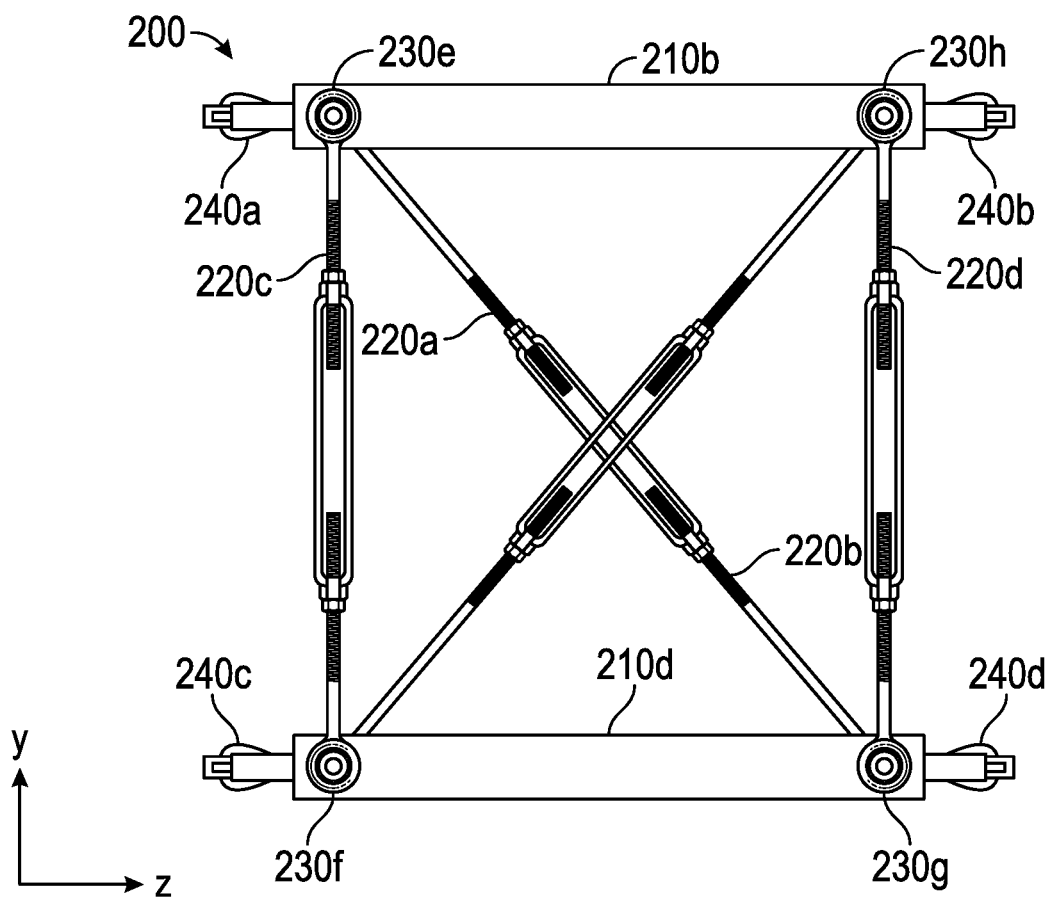
Figure 2D:
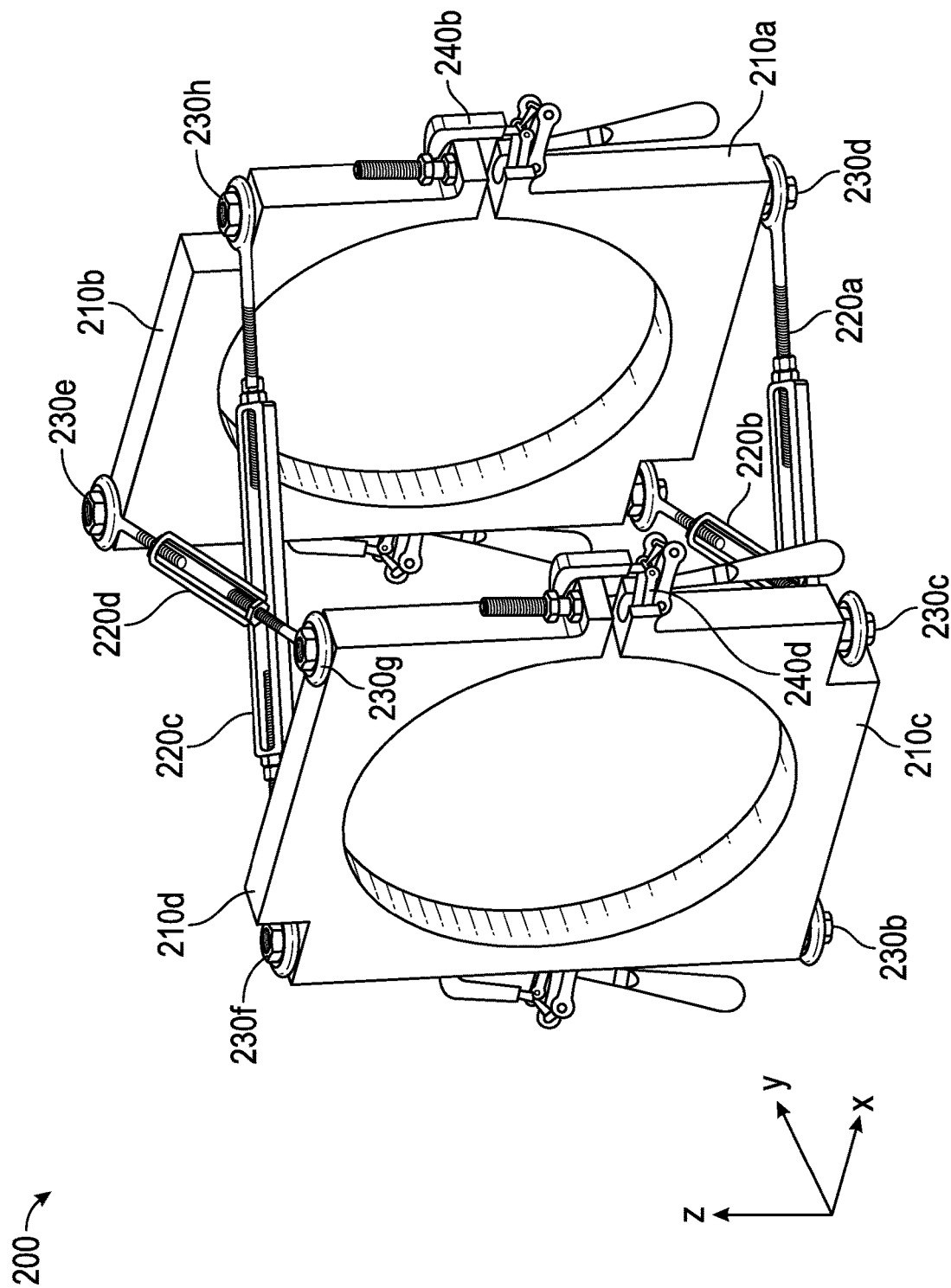
Figure 2E:
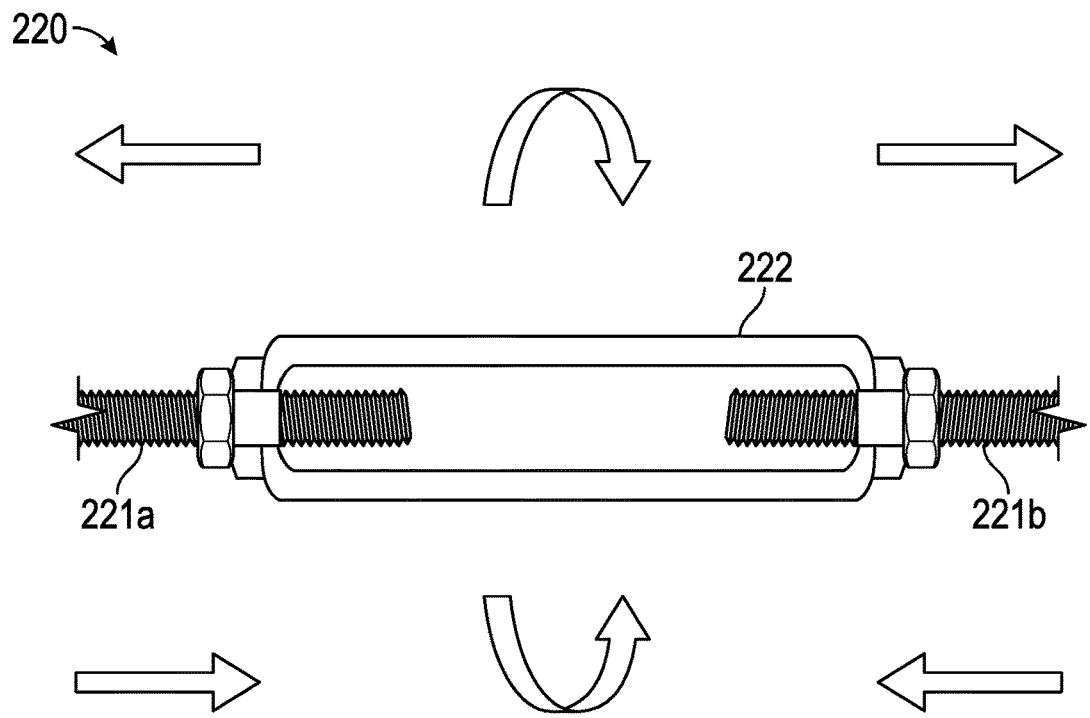
Figure 2F:
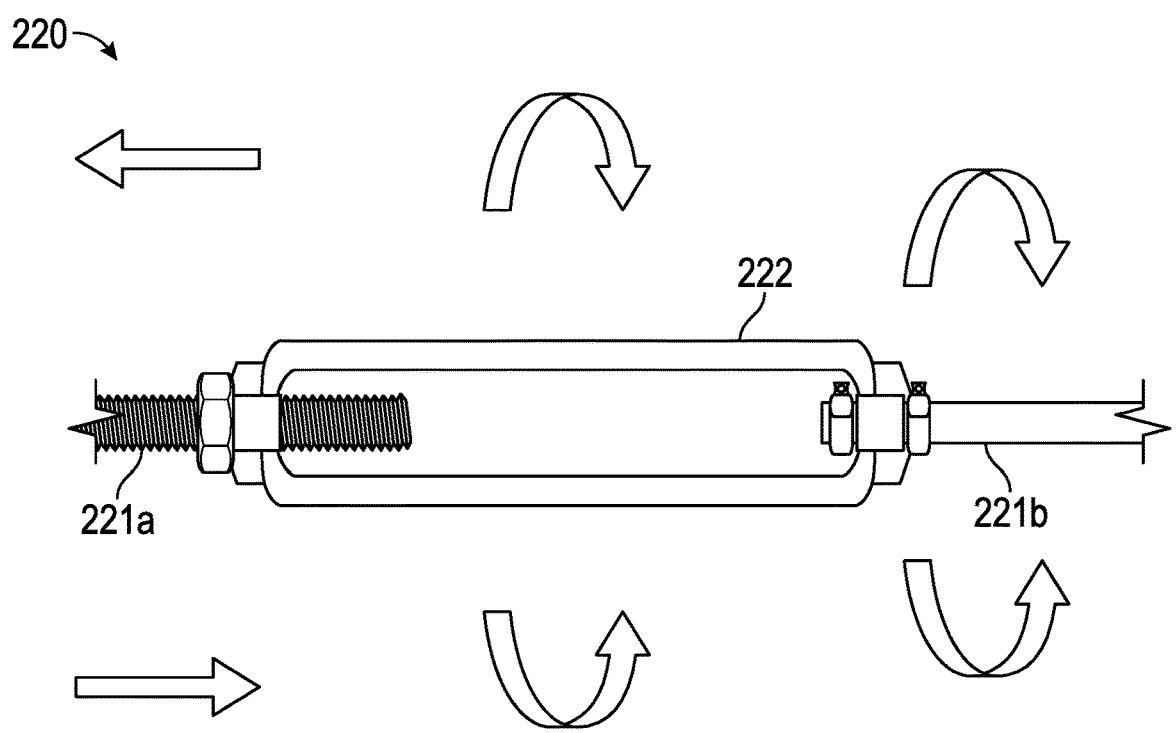

FIGS. 2A-F illustrate various views of a biasing tool 200 according to embodiments of the present disclosure. FIG. 2A illustrates a first view of the biasing tool 200 from a first perspective. FIG. 2B illustrates a lateral view of the biasing tool 200 from a second perspective. FIG. 2C illustrates a lateral view of an optional arrangement of the biasing tool 200 from the second perspective. FIG. 2D illustrates an isometric view of the biasing tool 200 from a third perspective. FIG. 2E illustrates a detail of an example rod assembly 220. FIG. 2F illustrates a detail of an example rod assembly 220. Depending on the view presented, a given component may be fully or partially obscured by another component. Therefore, one or more portions of a given component may be labeled with the same reference number for ease in identifying a given component in the illustrated views and the components may be present despite not being shown or labeled. Multiple instances of a given component are differentiated from one another by the use of a letter in conjunction with the reference number and an associated ordinal number (e.g., first, second, third). One of ordinary skill in the art will appreciate that the illustrations provide a set of non-limiting examples of some of the various shapes, dimensions, and arrangements possible for a biasing tool 200 and the components thereof.

The biasing tool 200 comprises a first collar and a second collar that are configured and operable to capture an end of the hose 130 in a through-hole defined by the collar. Each collar is formed by two yokes 210 that are mated together. For example, a first collar is formed by a first yoke 210*a* and a second yoke 210*b*, while a second collar is formed by a third yoke 210*c* and a fourth yoke 210*d*. In some aspects, each of the yokes 210 is connected to a yoke 210 from the other collar via a pair of rod assemblies 220 connected to the yokes 210 via rotation points 230. In other aspects, each collar is connected to the other collar by only one pair of yokes 210, using only one pair of rod assemblies 220. Each of the yokes 210 is secured to the other yoke 210 of the same collar via a latch 240.

In the illustrated examples, at least one of the paired rod assemblies 220 is disposed in a separate plane so that the paired rod assemblies 220 cross one another. For example, the first rod assembly 220*a* is connected to the first yoke 210*a* via the first rotation point 230*a* and to the third yoke 210*c* via the third rotation point 230*c* in a first plane, while the second rod assembly 220*b* is also connected to the first yoke 210*a* and the third yoke 210*c*, but in via the fourth rotation point 230*d* and the second rotation point 230*b*, which are disposed in a second plane. A second set of paired rod assemblies 220 may be disposed of similarly on an opposite side of the biasing tool 200 (e.g., in a third plane and a fourth plane) to cross one another, or may be disposed of in one plane (e.g., a third plane) in some embodiments (such as is illustrated in FIG. 2C). Each of the planes in which the rod assemblies 220 are disposed are parallel to one another, and perpendicular to the planes in which the through-holes of the collars are defined.

The rod assemblies 220 may be fixed in length or variable in length, and variable length rod assemblies 220 may be adjustable (controllable) in length, or free-floating (dependent on lengths of other rod assemblies 220) in length. Fixed-length rod assemblies 220 may include one or more rods attached at the rotation points 230. Free-floating rod assemblies 220 may include one or more rods attached at the rotation points 230 and connected or captured in a sliding arrangement relative to one another. Adjustable rod assemblies 220 may include one or more rods attached at the rotation points 230 and connected with one another via a length-controlling joint. As will be appreciated, rod assemblies 220 that are variable in length (either free-floating or adjustable) may include a locking mechanism to secure the current length of the rod assembly 220, such as a lock nut, a transverse pin inserted through a rod, an R-pin, friction grip, capture pins and rotational lock joints, etc.

For example, as detailed in FIG. 2E, an adjustable rod assembly 220 may be a turnbuckle, that uses threading on two rods 221 (e.g., left-handed threading on a first rod 221*a* and right-handed threading on a second rod 221*b*) and a threaded frame 222 connecting the two rods 221 as the length-controlling joint that may be rotated to affect a distance that the rods 221 extend from or protrude into the threaded frame 222. In another example, as detailed in FIG. 2F, an adjustable rod assembly 220 may be a swivel headed turnbuckle, that uses threading on a first rod 221*a* and a swivel joint on a second rod 221*b* to connect with a threaded frame 222 that may be rotated to affect a distance that the first rod 221a extends from or protrudes into the threaded frame 222 while keeping the second rod 221b at a predefined distance. As will be appreciated, other hardware may be used in an adjustable rod assembly 220 to control and maintain a length of the rod assembly 220.

In embodiments that use two sets of crossed rod assemblies 220, such as is illustrated in FIGS. 2A, 2B, and 2D, a first rod assembly 220a is paired with and crosses with a second rod assembly 220b between a first yoke 210a and a third yoke 210c, and a third rod assembly 220c is paired with and crosses with a fourth rod assembly 220d between a second yoke 210b and a fourth yoke 210d. The lengths of the rod assemblies 220 in this example are matched such that the lengths of the first rod assembly 220a and the third rod assembly 220c are matched, and the lengths of the second rod assembly 220b and the fourth rod assembly 220d are matched.

One or both of the sets of matched rod assemblies 220 (e.g., first rod assembly 220a and third rod assembly 220c; second rod assembly 220b and the fourth rod assembly 220d) may be adjustable in length, to thereby affect a bias in a hose 130 captured by the collars. In some embodiments with one set of adjustable matched rod assemblies 220, the non-adjustable set of matched rod assemblies 220 may have a fixed length or may be free-floating, such that the length of the rod assemblies 220 may change in response to adjustments made to the other set of rod assemblies 220 but is not adjustable on its own. In other embodiments, one pair of rod assemblies 220 are adjustable, and the corresponding matched rod assemblies are free-floating with variable lengths that change in response to the adjustments made to the matched rod assembly 220. For example, the first rod assembly 220a and the second rod assembly 220b may be adjustable and the respective matched third rod assembly 220c and fourth rod assembly 220d would be free-floating; variable in length, but controlled by adjustments made to the matched rod assembly 220. In yet further embodiments, all of the rod assemblies 220 are adjustable.

In embodiments that use one set of crossed rod assemblies 220 and one set of parallel rod assemblies 220, such as is illustrated in FIG. 2C, a first rod assembly 220a is paired with and crosses with a second rod assembly 220b between a first yoke 210a and a third yoke 210c, and a third rod assembly 220c is paired with and runs in parallel with a fourth rod assembly 220d between a second yoke 210b and a fourth yoke 210d. The lengths of the parallel rod assemblies 220 in this example are matched such that the lengths of the third rod assembly 220c and the fourth rod assembly 220d are even, but in other examples the lengths of the parallel rod assemblies 220 may be uneven (e.g., while adjusting their lengths, to introduce a curve into the hose 130).

At least one of the rod assemblies 220 are adjustable in length, to thereby affect a bias in a hose 130 captured by the collars. In embodiments where only a first crossed rod assembly 220a is adjustable, the crossed second rod assembly 220b may be fixed or free-floating in length and the parallel third rod assembly 220c and parallel fourth rod assembly 220d will be free-floating or fixed in length respectively. In embodiments where both the first crossed rod assembly 220a and the crossed second rod assembly 220b are adjustable, the parallel third rod assembly 220c and parallel fourth rod assembly 220d may both be one of fixed, free-floating, or adjustable in length or one may be free-floating and the other adjustable in length.

Each of the rotation points 230 confine the movement of the connected rod assembly 220 to rotation in a single plane. Each of the rotation points 230 are paired with another rotation point 230 in the same plane, and several planes may be defined by pairs of rotation points 230 and the associated rod assemblies 220. For example, as is shown in at least FIGS. 2A-D: a first rod assembly 220a, a first rotation point 230a, and a third rotation point 230c, and are in a first plane, and a second rod assembly 220b that crosses the first rod assembly 220a is in a second plane along with a second rotation point 230b and a fourth rotation point 240d so as to not interfere with the first rod assembly 220a. Parallel rod assemblies 220, such as those illustrated in FIG. 2D for the third rod assembly 220c and the fourth rod assembly 220d, may be located in a shared plane. Each of the planes for the rotation points 230 are parallel to one another, and are perpendicular to the planes through which the hose 130 longitudinally passes.

The latches 240 hold together two yokes 210 to form a collar. The latches 240 may be selectively engaged and disengaged to capture a hose 130 in the collars and to release the hose 130 therefrom. Additionally, depending on the type of latch 240 used, a constrictive or clamping force applied to the hose 130 via the collars may be adjusted by the latch 240. Various different types of latches 240 may be integrated into a yoke 210, and several examples are discussed in greater detail in FIGS. 4A-4E.

Figure 3A:
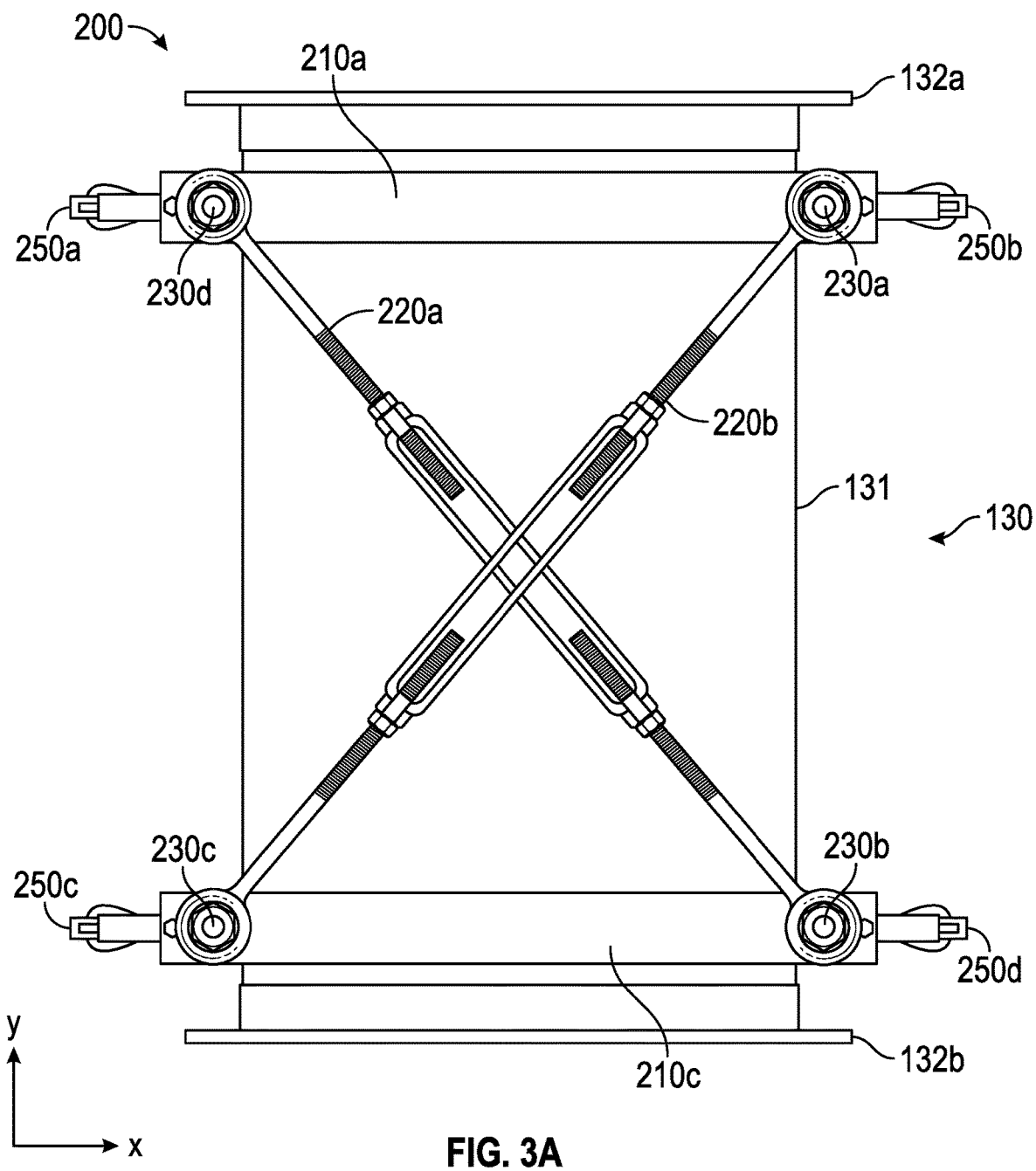
FIGS. 3A and 3B illustrate the biasing of a hose with a biasing tool according to embodiments of the present disclosure.
Figure 3B:
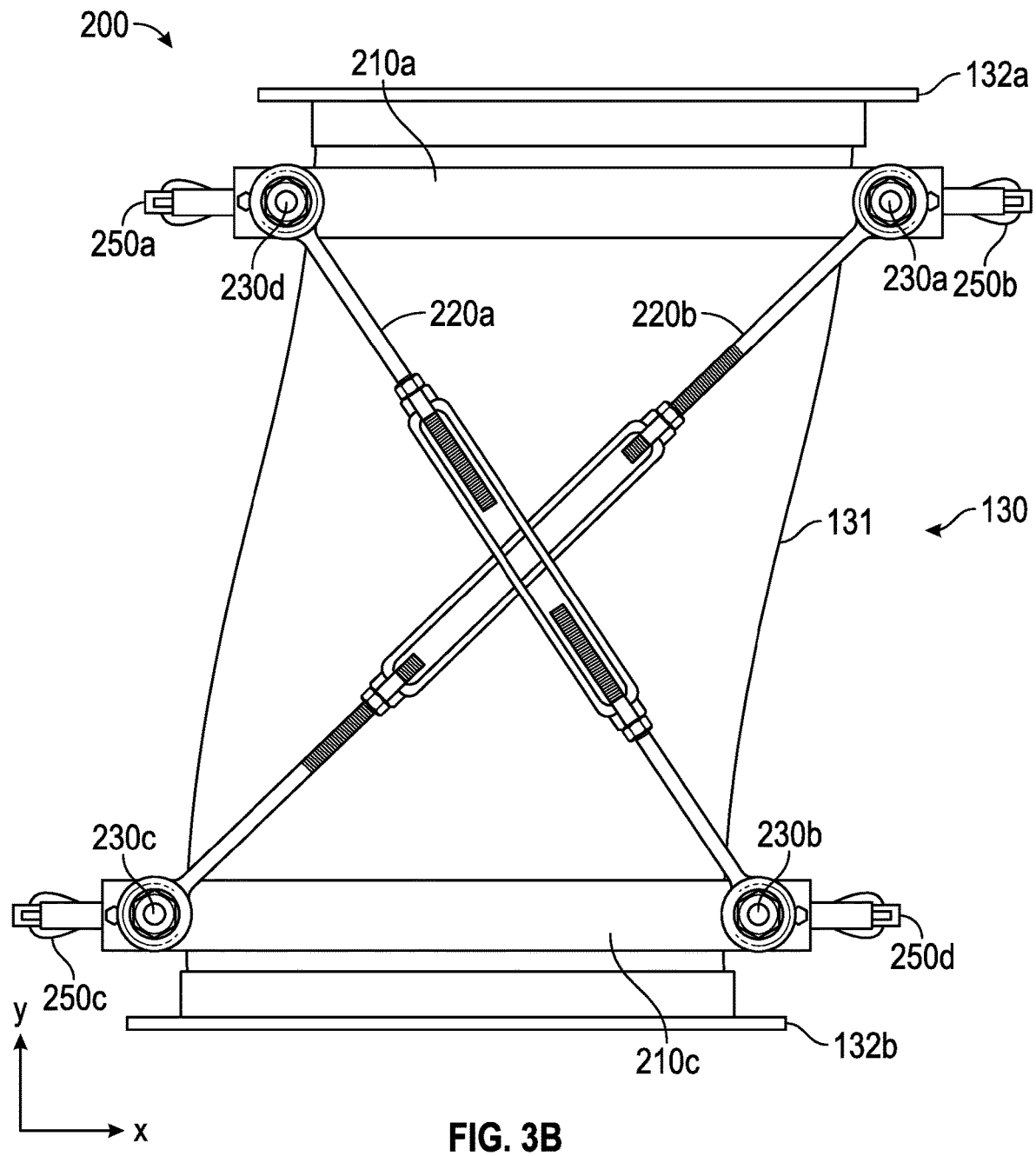

FIGS. 3A and 3B illustrate the biasing of a hose 130 with a biasing tool 200 according to embodiments of the present disclosure. FIG. 3A illustrates an "unbiased" state (also referred to as a "neutral" or "relaxed" state) for the hose 130. FIG. 3B illustrates a "biased" state (also referred to as a "stretched" or "counter-biased" state (relative to the biased state of the system to which the hose 130 is installed)) for the hose 130 relative to FIG. 3A. It will be appreciated that other biases are possible with greater or lesser deflection in one or more directions and that imparting rotational biases on the hose 130 is also contemplated.

In the illustrated examples, the hose 130 is captured by the biasing tool 200, with a first end of the hose 130 gripped by at least a first yoke 210a, and the second end of the hose 130 gripped by at least a third yoke 210c. In the illustrated examples, the body 131 of the hose 130 is gripped, but in other examples one or more of the mounting segments 132 of the hose 130 may be gripped in addition to or instead of the body 131 to capture the hose 130.

Although not shown in the current view, the first yoke 210a may form a first collar with a second yoke 210b (not shown) that defines a first through-hole that captures the first end of the hose 130, and the third yoke 210c may form a second collar with a fourth yoke 210d (not shown) that defines a second through-hole that captures the second end of the hose 130. The second yoke 210b may be connected to the fourth yoke 210d by rod assemblies 220 on the opposite side of biasing tool 200 from the illustrated first rod assembly 220a and second rod assembly 220b (e.g., a third rod assembly 220c and a fourth rod assembly 220d). In some embodiments, the third rod assembly 220c is parallel to the first rod assembly 220a and crossed the fourth rod assembly 220d, which is parallel to the second rod assembly 220b. To adjust the respective lengths of the rod assemblies 220 in such an arrangement, the lengths of the first rod assembly 220a and the third rod assembly 220c may be adjusted concurrently (i.e., extending at the same time or retracting at the same time), and/or the lengths of the second rod assembly 220b and the fourth rod assembly 220d may be adjusted concurrently.

Both the first rod assembly 220a and the second rod assembly 220b are variable in length in the current example, although in other examples one of the rod assemblies 220 may be fixed in length. As user adjusts the length of the rod assemblies 220, the relative position of the first yoke 210a to the third yoke 210c is affected; introducing bias into the captured hose 130. For example, if the rod assemblies 220 are turnbuckles, a user may rotate the turnbuckle frames of one or more of the rod assemblies 220 to affect an associated length of that rod assembly 220. When the user affects the first length of the first rod assembly 220a differently than the second length of the second rod assembly 220b, the biasing tool 200 laterally biases the captured hose 130, as is shown in FIG. 3B. When the user affects the first length of the first rod assembly 220a the same as the second length of the second rod assembly 220b, the biasing tool 200 longitudinally biases the captured hose 130; stretching or compressing the hose 130 from the neutral state. Accordingly, it is possible to displace respective ends of a captured hose 130 in three dimensions using aspects described herein.

FIGS. 4A-E illustrate various examples of a yoke 210 in an overhead schematic view according to embodiments of the present disclosure. A yoke 210 may be used singly or as part of a pair to capture an end of the hose 130 for biasing depending on the hardware used to secure the hose 130. A biasing tool 200 may therefore include at least two yokes 210, but may include three or four (or more) yokes 210 depending on the given embodiment employed.

A yoke 210 includes at least two rotation points 230, by which rod assemblies 220 are connected to the yoke 210, and defines a curvature 211 into which the hose 130 may be captured. In various embodiments, such as illustrated in FIGS. 4A-E, each of the at least two rotation points 230 are defined on a different parallel plane from each other that is perpendicular to the plane defined by the curvature 211 in which a hose 130 may be captured. In other embodiments, two or more rotation points 230 may be defined in a shared plane that is perpendicular to the plane defined by the curvature 211 in which a hose 130 may be captured. In embodiments using paired yokes 210 that form collars, various latches 240 are used to secure the hose 130 in a through-hole defined by two curvatures 211. Each yoke 210 includes hardware for securing the hose 130 in its curvature 211.

In embodiments using paired yokes 210 to secure a given end of the hose 130, the other yoke 210 forms part of this hardware, that may be secured by various latches 240, with a first yoke 210a of the pair providing a first part for a first latch 240a and a second part for a second latch 240b, and the second yoke 210b providing a second part of the first latch 240a and a first part for the second latch 240b.

Figure 4A:
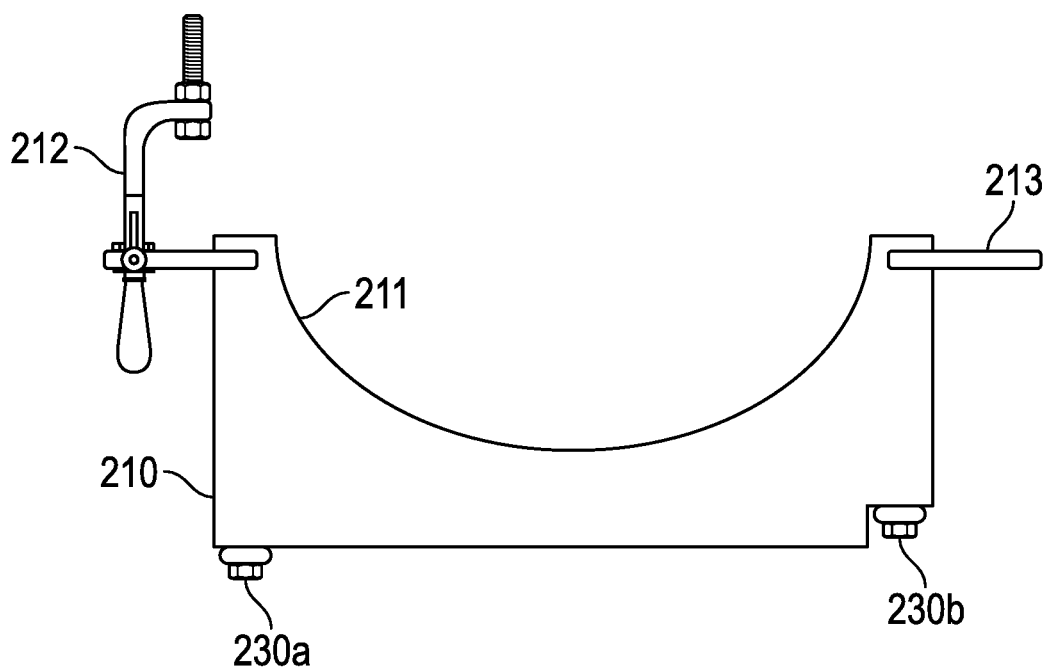
FIGS. 4A-E illustrate various examples of a yoke in an overhead schematic view according to embodiments of the present disclosure.

In a first example, an embodiment of which is shown in FIG. 4A, a hasp 212 is used as the first part of a latch 240 and a staple 213 that protrudes from the body of the yoke 210 is used as the second part for the hasp 212. The hasp 212 extends over and mates with the staple 213 of a companion yoke 210 in the collar to secure the two yokes 210 together and thereby capture a hose 130 between the two yokes 210. In various embodiments, a spring latch, or adjustable length screw is used to ensure a secure connection between a hasp 212 and the staple 213, which may be tightened or loosened by an operator.

Figure 4B:
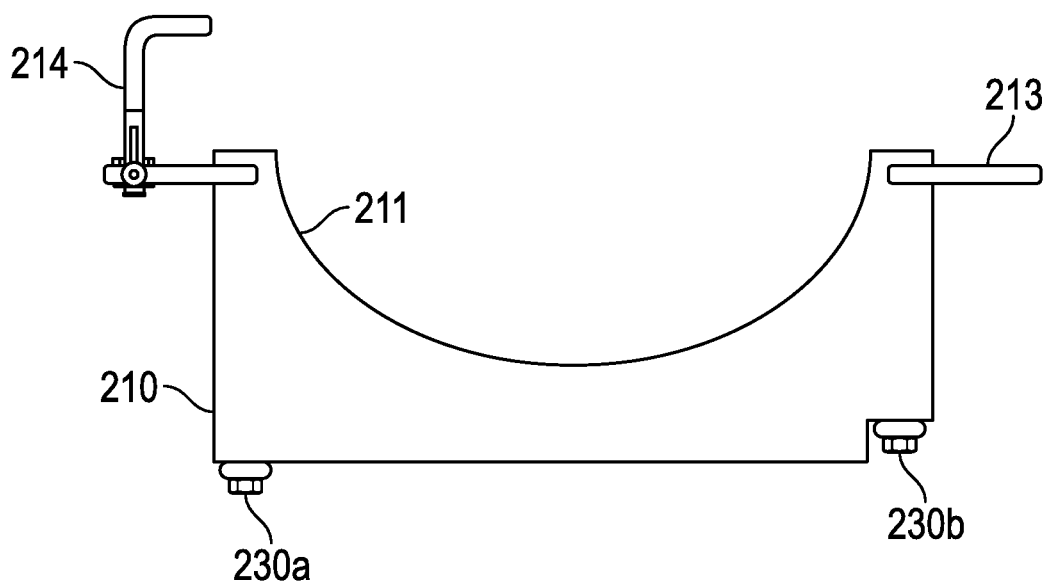

In a second example, an embodiment of which is shown in FIG. 4B, a clamp 214 is used as the first part of a latch 240 and a staple 213 that protrudes from the body of the yoke 210 is used as the second part for the hasp 212. The clamp 214 of a first yoke 210a is adjusted to pull the staple 213 of a second yoke 210b towards the first yoke 210a to secure the two yokes 210 together and thereby capture a hose 130 between the two yokes 210. In various embodiments, the clamp 214 is a threaded clamp, and may be mounted on a swivel and/or swage to facilitate placing the clamp 214 relative to the staple 213.

Figure 4C:
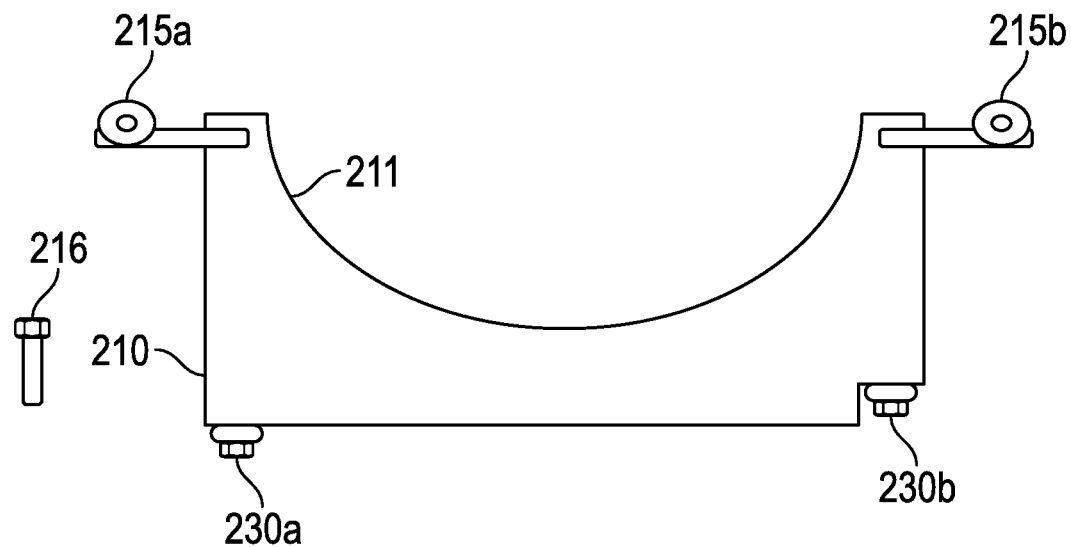

In a third example, an embodiment of which is shown in FIG. 4C, a hinge is formed between a first barrel 215a of one yoke 210, and the second barrel 215b of another yoke 210, secured by a pivot 216 inserted through the first barrel 215a and the second barrel 215b. Each of the barrels 215 runs longitudinally in the direction that the hose 130 (in its neutral state) runs, and the barrels 215 are interleaved with one another (e.g., a topmost portion of the first barrel 215a is "above" a topmost portion of the second barrel 215b, which is above a second-topmost portion of the first barrel 215a, which is above a second-topmost portion of the second barrel 215b, etc.). As will be appreciated, one hinge may remain secured by its pivot 216 to allow an operator to secure a hose 130 in the biasing tool 200 by swinging the biasing tool open and closed, and then securing the second hinge with its pivot 216.

In embodiments using a single yoke 210 to secure a given end of the hose 130, various hardware are used to press the hose 130 into the curvature 211 of the yoke 210 or to prevent the hose 130 from being removed from the curvature 211.

Figure 4D:
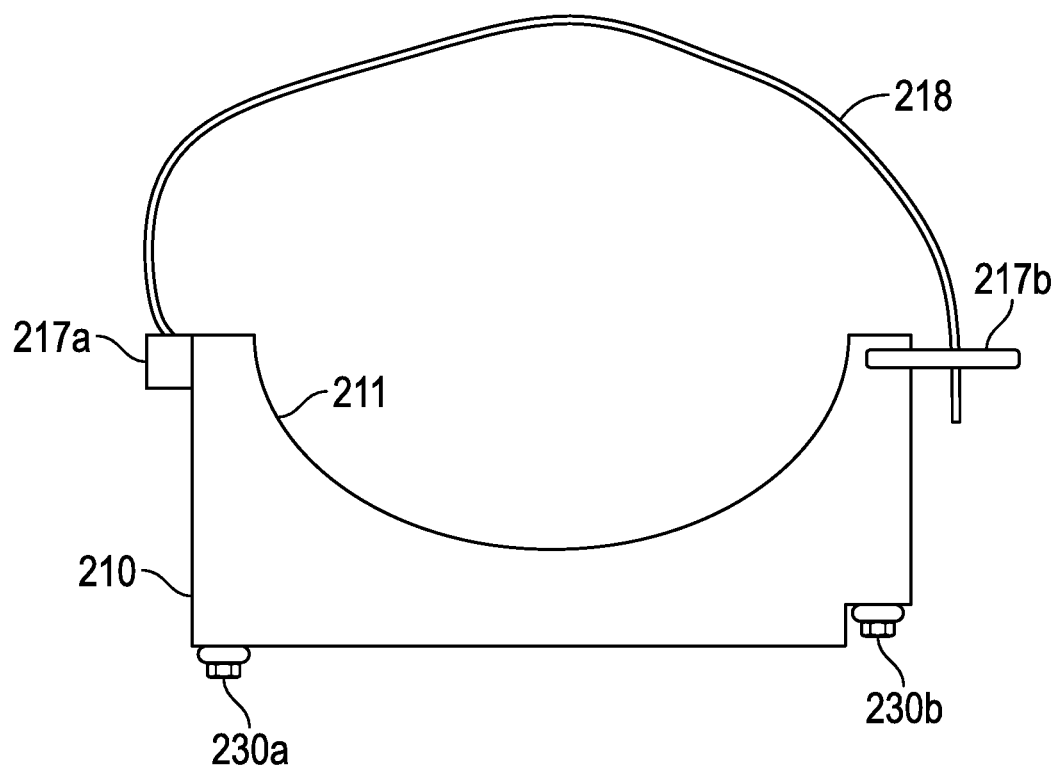

In a fourth example, an embodiment of which is shown in FIG. 4D, a first buckle 217a and a second buckle 217b are used to secure a strap 218 to the yoke 210, which in turn secures a hose 130 to the curvature 211. In various embodiments, the buckles 217 may selectively engage and disengage the strap 218 to allow the strap 218 to be loosened and tightened to release and engage the hose 130. In other embodiments, the buckles 217 may permanently engage the strap 218, and the strap may be made of an elastic material that is stretch over the hose 130 to engage the hose 130 and press the hose against the curvature 211. In yet other embodiments, a first buckle 217a permanently engages the strap 218, and the second buckle 217b may selectively engage and disengage the strap 218 to allow the strap 218 to be loosened and tightened to release and engage the hose 130.

Figure 4E:
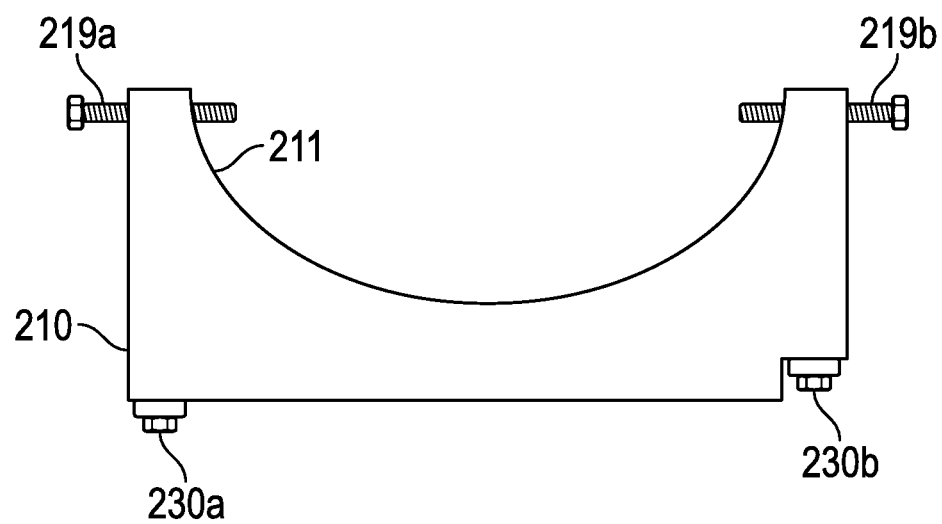

In a fifth example, an embodiment of which is shown in FIG. 4E, a first pressure screw 219a and a second pressure screw 219b are used to secure a hose 130 to the curvature 211 of the yoke 210. When a hose 130 is place in the curvature 113, the pressure screws 219 are extended inward to engage the hose 130 and prevent the hose 130 from being removed. In some embodiments, pressure screws 219 are used when paired yokes 210 form collars to enable a rotational or torsional bias to be applied and maintained in the hose 130. For example, the pressure screws 219 in a first collar may be used to secure a first end of the hose 130 (preventing its rotation), and the second end of the hose 130 is torqued relative to the first end, and secured in the torqued position via the pressure screws in a second collar that secures the second end of the hose 130.

Figure 5A:
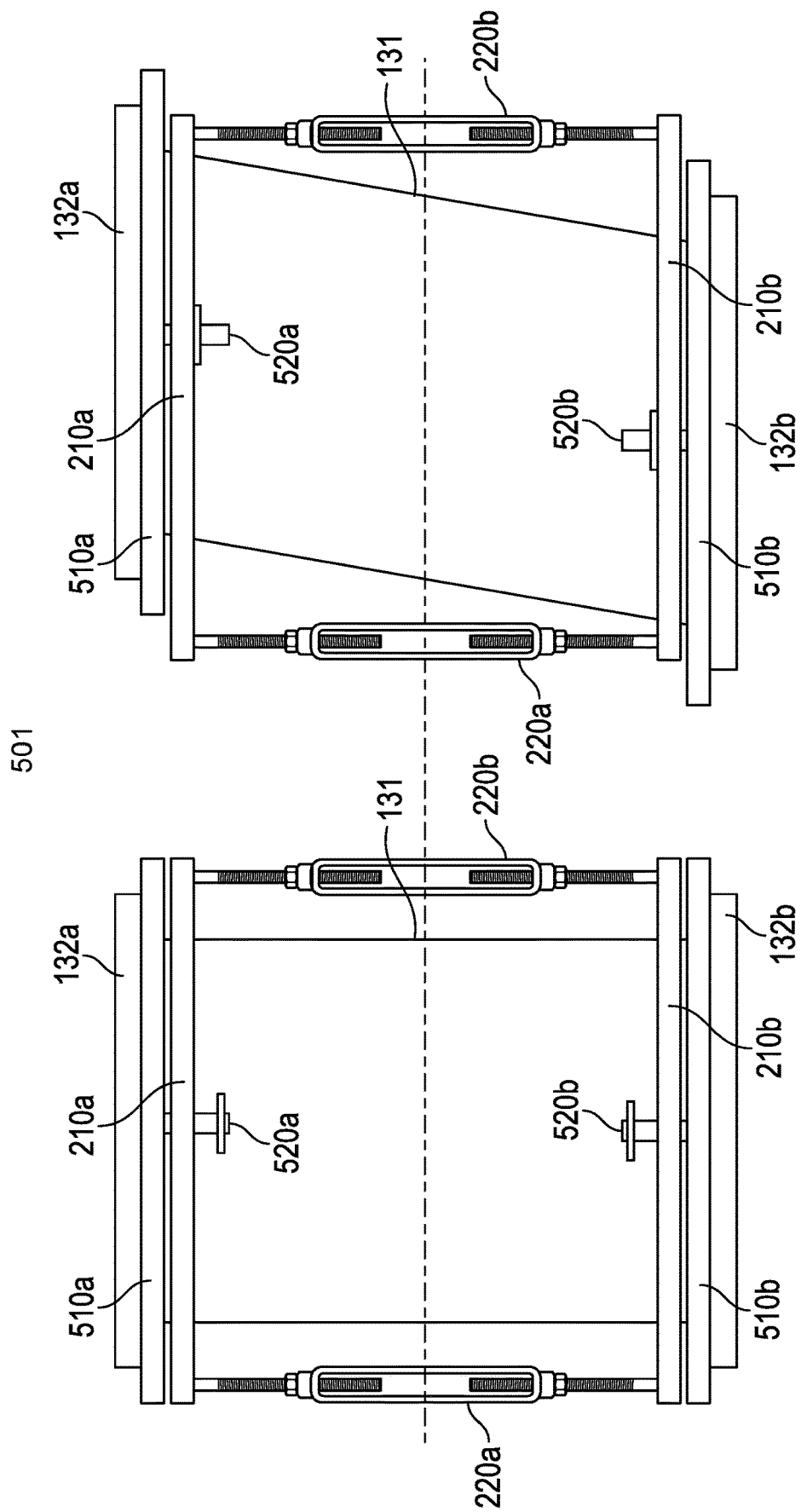
FIGS. 5A-D illustrate examples of a biasing tool which decouple the adjustment degrees of freedom according to embodiments of the present disclosure.
Figure 5B:
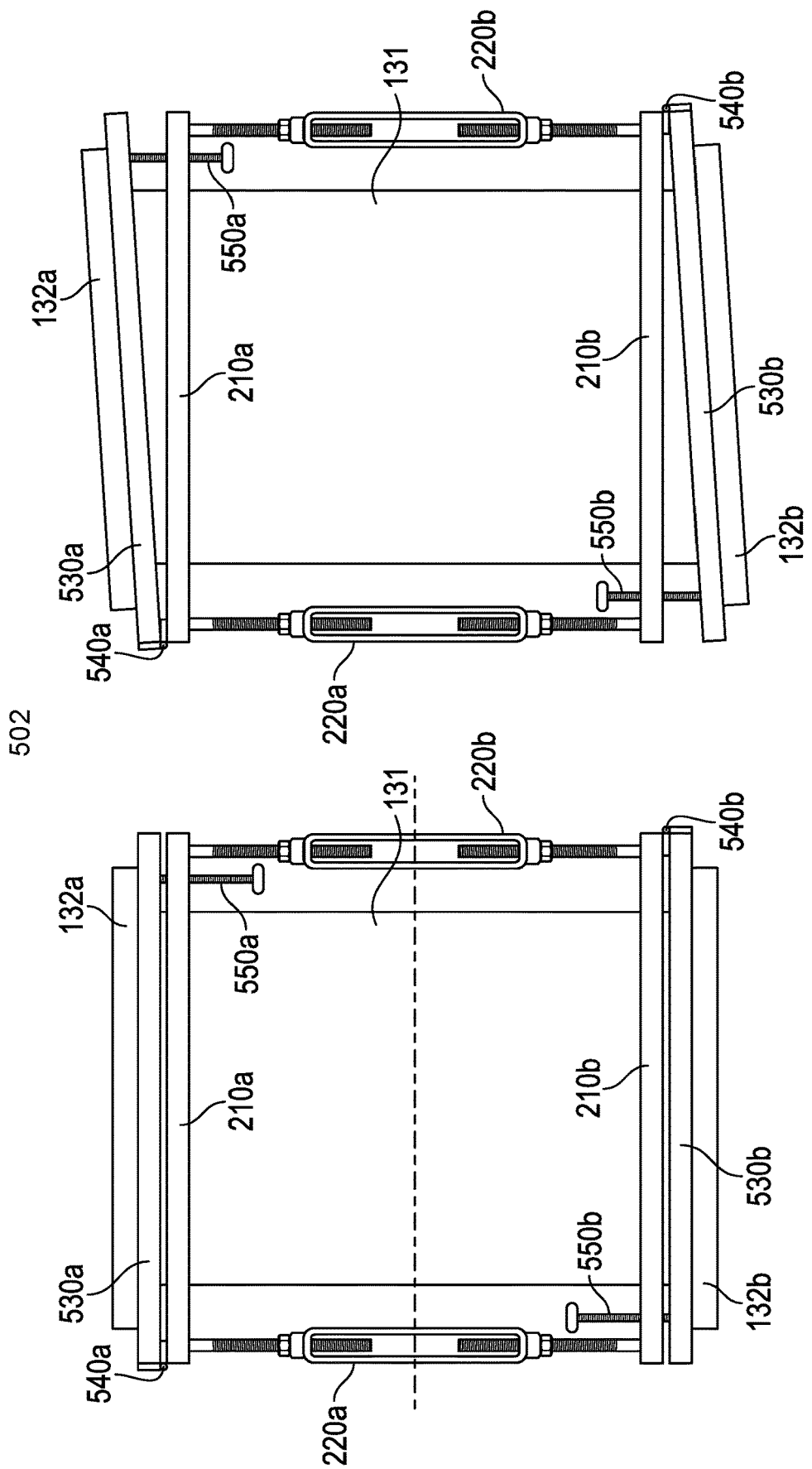
Figure 5C:
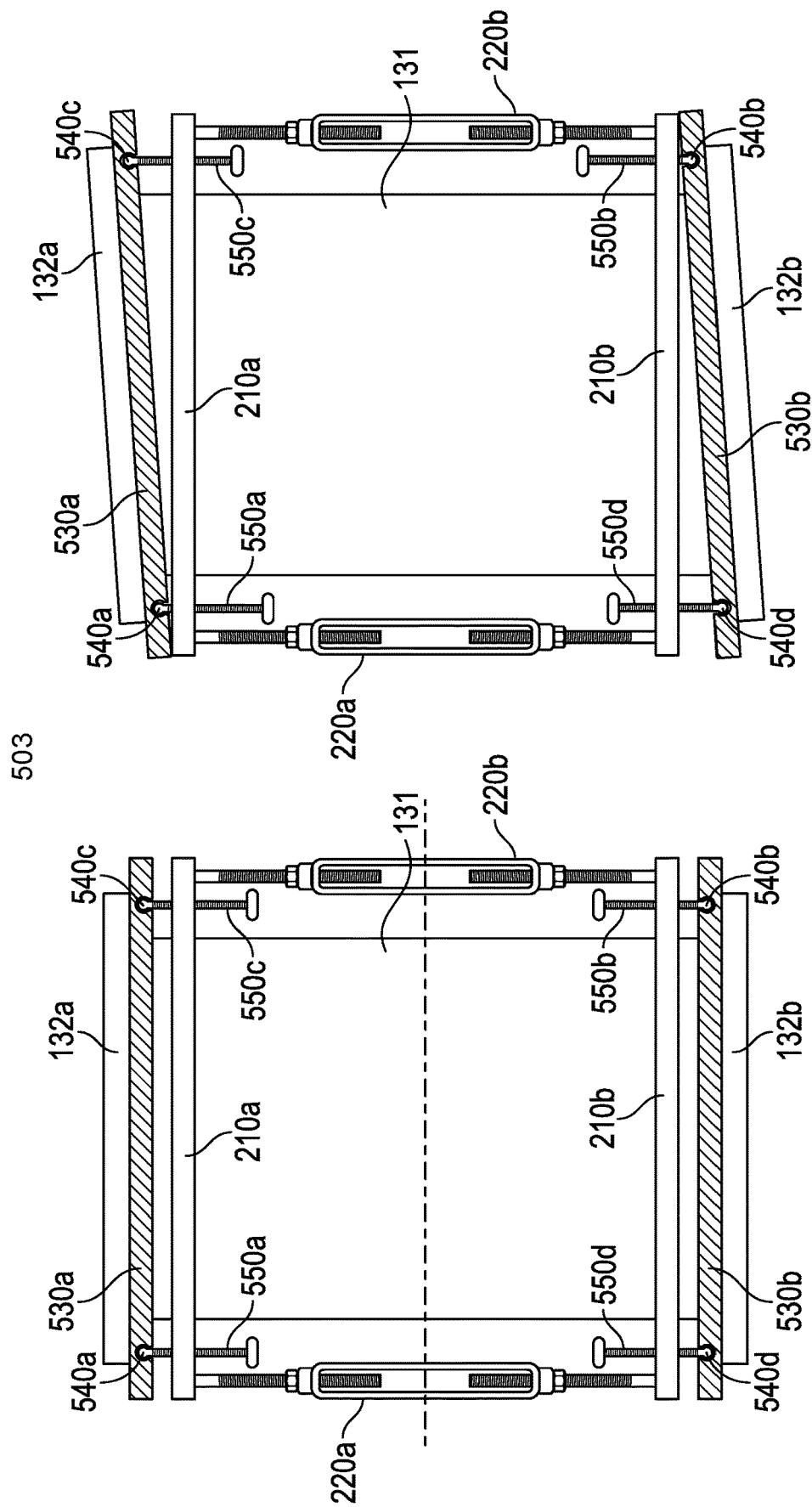
Figure 5D:
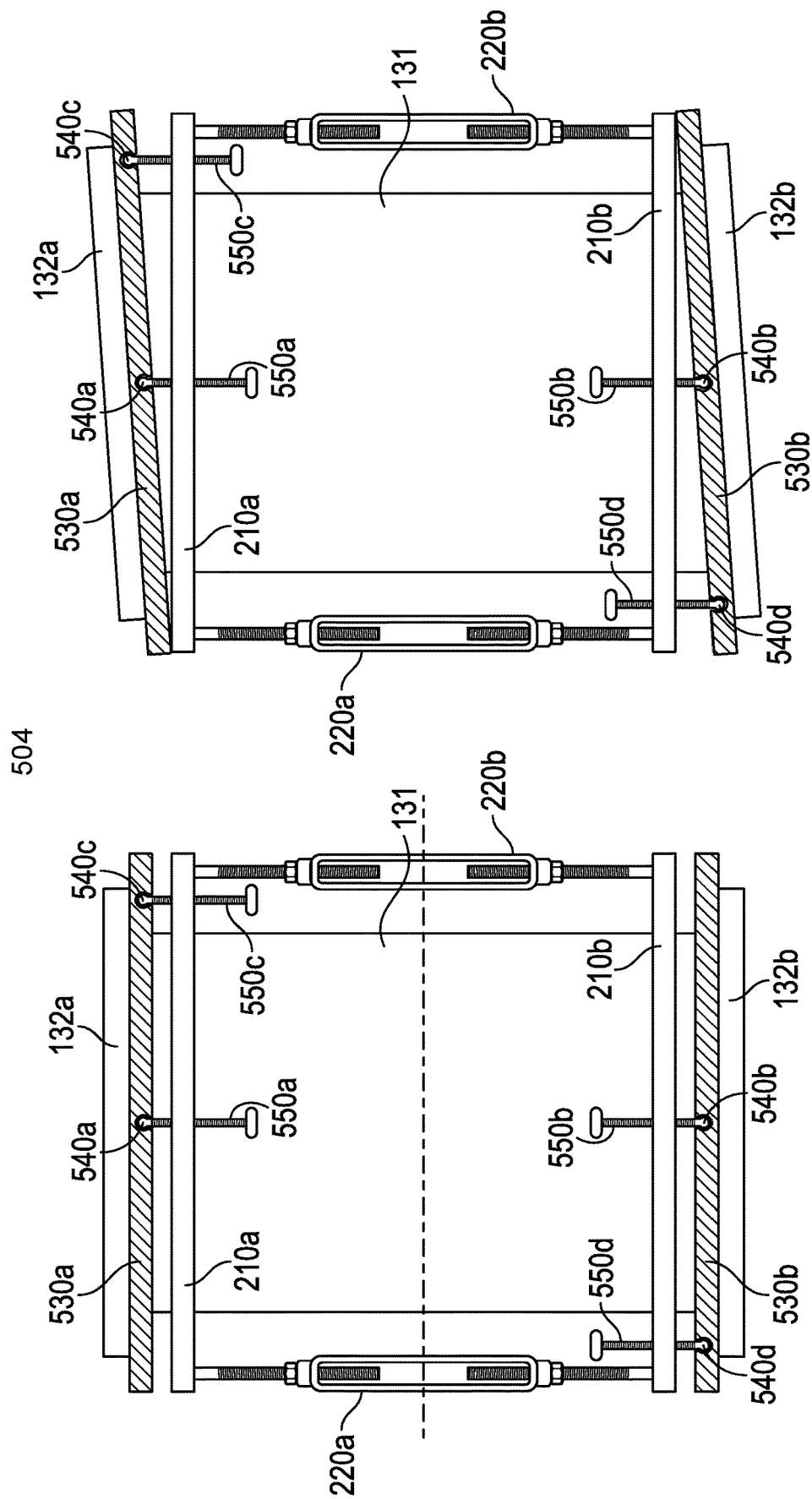

FIGS. 5A-D illustrate examples of a biasing tool 200 which decouple the adjustment Degrees Of Freedom (DOF). FIG. 5A illustrates example biasing tools 200 in which lateral DOF are decoupled, whereas FIG. 5B-D illustrate example biasing tools 200 in which all DOF are decoupled from the adjustment of other DOF.

In the biasing tools 200 illustrated in FIGS. 5A-D, the adjustable rod assemblies 220 are connected to an intermediate yoke 210 (or yoke pair), which in turn is connected to an adjustable yoke or adjustable yoke pair (including sliding yokes 510 or mobile yokes 530), which in turn is connected to the bellows flanges or mounting segments 132 of a captured hose 130. The central pass-through opening in the intermediate yoke pair is large enough to accommodate the lateral bellows deflection (sliding) of the hose 130. Also, because the mounting segments 132 are relatively stiff (in comparison to the body 131 of the hose 130), it is understood that the adjustable yoke does not necessarily need to grip the body 131 of the hose 130 if provisions are incorporated for temporarily capture of at least a portion of the mounting segment 132 to a curvature 211 of the yoke 210 or adjustable yoke. Indeed, an adjustable yoke connected to half of a mounting segment 132 via separate dedicated inserts (e.g., a horse collar or harness type connection) may be used in various embodiments. As will be appreciated, the rod assemblies 220 discussed in relation to FIGS. 5A-D may include any of the fixed, adjustable, and free-floating variants envisioned elsewhere in the present disclosure. Similarly, although not illustrated, rotational bias can be imparted by the apparatuses in FIG. 5A-D, as envisioned elsewhere in the disclosure.

In the example biasing tools 200 illustrated in FIG. 5A, axial and rotational DOF are affected through the rod assemblies 220 whereas the lateral DOF (i.e., parallel offset) is affected by lateral movement of sliding yokes 510 (or sliding collars). The sliding yokes 510 move laterally relative to the yokes 210 to affect the lateral biasing in the captured hose 130. In various embodiments, a sliding lug 520 is used to capture the sliding yoke 510 in a track defined in the yoke 210, such that when loosened, the sliding yoke 510 is permitted to slide back and forth along the track, and when tightened, the sliding lug 520 restricts movement of sliding yoke 510; locking the bias imparted to the hose 130 in place. In other embodiments, the sliding lug 520 may be a c-clamp or other externally mounted hardware to selectively secure the sliding yoke 510 to a respective yoke 210.

In the first view 501 of the biasing tool 200, the first sliding lug 520a and the second sliding lug 520b are loosened, and the first sliding yoke 510a and the second sliding yoke 510b (connected, respectively to the first yoke 210a and the second yoke 210b) hold the hose 130 in a laterally neutrally biased position, although the first rod assembly 220a and the second rod assembly 220b may impart a longitudinal bias to the hose 130 (e.g., stretching or compressing). In comparison, in the second view 502 of the biasing tool 200, the first sliding lug 520a and the second sliding lug 520b are tightened to hold the first sliding yoke 510a in position relative to the first yoke 210a and the second sliding yoke 510b in position relative to the second yoke 210b to hold the hose 130 with a lateral bias.

In the example biasing tools 200 illustrated in FIGS. 5B-D, all DOF are completely decoupled and therefore set independently, resulting in no confounding of the DOF with other adjustments to the biasing tool 200 and allowing each DOF to be adjusted individually. As in the biasing tool 200 illustrated in FIG. 5A, axial deflection is affected by the rod assemblies 220, and the flanges or mounting segments 132 are connected to outboard mobile yokes 530 or horse collars. Each mobile yoke 530 is connected to a yoke 210 via a pivot 540, which allows at least a portion of the mobile yoke 530 to longitudinally (with reference to the hose 130) deflect relative to the yoke 210 to introduce longitudinal bias into the hose 130. In some embodiments, the pivot 540 is disposed of in a track in the yoke 210, and may be selectively secured at several locations along the width of the yoke 210, thus allowing the mobile yoke 530 to also act as a sliding yoke 510.

An amount of bias affected on a captured hose 130 by a mobile yoke 530 is determined by a height at which one or more height lugs 550 in contact with the mobile yoke 530 push (or pull) portions of the mobile yoke 530 relative to the yoke 510. The height lugs 550 are disposed of through the yokes 210 and connected to the mobile yokes 530 such that the height of the height lug 550 may be adjusted; extending to increase distance between the mobile yoke 530 and the yoke 210, and retracting to reduce distance between the mobile yoke 530 and the yoke 210. In some examples, the height lugs 550 include pivots 540 disposed of in the mobile yokes 530, such as, for example, ball joints, hinge joints, or the like. In other aspects, the height lugs 550 are screws that contact the mobile yoke 530 at a distal end to rotate the mobile yoke 530 relative to a separate pivot 540 mounted between the yoke 210 and the mobile yoke 530.

In a third view 503 and a fourth view 504 of the biasing tool 200, illustrated in FIG. 5B, a first pivot 540a is located at or near an edge of the first mobile yoke 540a and the first yoke 210a, and a second pivot 540b is located at or near an edge of the second mobile yoke 210b and the second yoke 210b. Although illustrated on opposite edges of the biasing tool 200, in some aspects, the first pivot 540a and the second pivot 540b may be located on the same edges of the biasing tool 200 and may slide to various positions along the respective yokes 210 in various embodiments. A first height lug 550a and a second height lug 550b are shown in the third view 503 in a retracted position; holding the respective mobile yokes 530 flush with the yokes 210. Fourth view 504 illustrates the first height lug 550a and the second height lug 550b in extended positions; affecting a bias on the hose 130 via the first mobile yoke 530a and the second mobile yoke 530b respectively.

In a fifth view 505 and a sixth view 506 of the biasing tool 200, illustrated in FIG. 5C, a first pivot 540a and a third pivot 540c are located at or near the edges of the first mobile yoke 530a, and a second pivot 540b and a fourth pivot 540d are located at or near the edges of the second mobile yoke 530b. In the illustrated examples in FIG. 5C, each of the pivots 540 is formed with an end of an associated height lug 550, such as a height lug 550 that provides a ball-end captured in a socket defined in the mobile yoke 530 to provide a ball-and-socket pivot 540. Although illustrated in a fixed location in the fifth view 505 and the sixth view 506, the pivots 540 may slide to various positions along the respective yokes 210 in various embodiments. The first through fourth height lugs 550a-d are shown in the fifth view 505 in neutral positions; holding the respective mobile yokes 530 parallel with the yokes 210. The sixth view 506 illustrates the first height lug 550a and the second height lug 550b in extended positions and the third height lug 550c and fourth height lug 550d in retracted positions; affecting a bias on the hose 130 via the first mobile yoke 530a and the second mobile yoke 530b respectively.

In a seventh view 507 and an eighth view 508 of the biasing tool 200, illustrated in FIG. 5D, a first pivot 540a is located at or near the center of the first mobile yoke 530a and the first yoke 210a, and a second pivot 540b is located at or near the center of the second mobile yoke 530b and the second yoke 210b. In the illustrated examples in FIG. 5D, each of the pivots 540 is formed with an end of an associated height lug 550, such as a height lug 550 that provides a ball-end captured in a socket defined in the mobile yoke 530 to provide a ball-and-socket pivot 540. Although illustrated in a fixed location in the fifth view 505 and the sixth view 506, the pivots 540 may slide to various positions along the respective yokes 210 in various embodiments. The first through fourth height lugs 550a-d are shown in the seventh view 507 in neutral positions; holding the respective mobile yokes 530 parallel with the yokes 210. The eighth view 508 illustrates the first height lug 550a and the second height lug 550b in extended positions and the third height lug 550c and fourth height lug 550d in neutral positions; affecting a bias on the hose 130 via the first mobile yoke 530a and the second mobile yoke 530b respectively.

Figure 6:
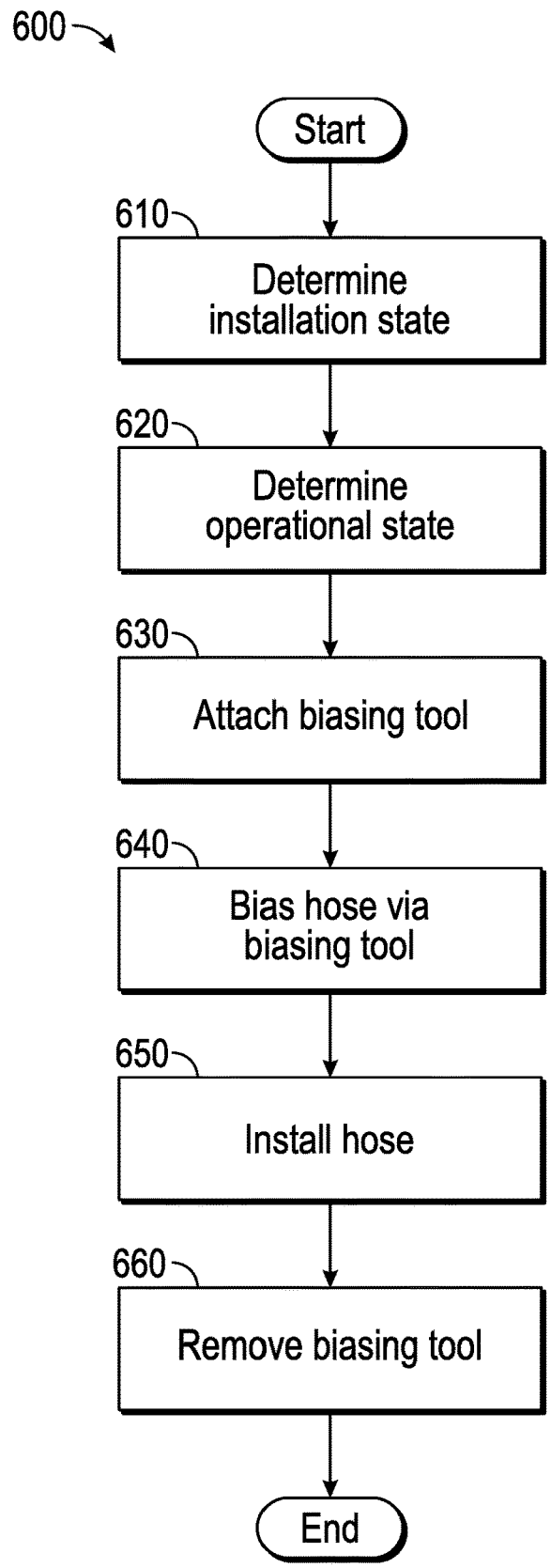
FIG. 6 is a flowchart illustrating operations of an example method for installing a hose with a biasing tool according to embodiments of the present disclosure.

FIG. 6 is a flowchart illustrating operations of an example method 600 for installing a hose 130 with a biasing tool 200 according to embodiments of the present disclosure. Method 600 begins with block 610 an installation state is determined for a first pipe 110 and a second pipe 120. At block 620, an operational state for the first pipe 110 and the second pipe 120 are determined. The differences in the positions of the installation state and the operational state of the openings of a first pipe 110 and a second pipe 120 are determined and a hose 130 is selected that has sufficient length and flexibility to reach between those two openings in both the installation and operational state.

Proceeding to block 630, the biasing tool 200 is attached to the hose 130. Depending on the embodiment of the biasing tool 200, a first yoke 210a may capture a first end of the hose 130 and a second yoke may capture a second end of the hose 130 via various configurations. For example, a third yoke 210c may be latched with the first yoke 210a, and a fourth yoke 210d latched with the second yoke 210b to define a through-hole having a diameter sized to capture the hose 130. In another example, straps 218 or pressure screws 219 are used to secure the hose 130 to a curvature 211 of the yokes 210. Similarly, depending on the embodiment of the biasing tool 200, the hose 130 may be captured at a body 131 of the hose 130, at a mounting segment 132 of the hose 130, or both by the biasing tool 200.

At block 640, the hose 130 is biased via the biasing tool 200 to counter-bias the bias between the installation state and the operational state of the first pipe 110 and the second pipe 120. The various rod assemblies 220 linking the yokes 210 are adjusted in lengths to affect the counter-bias in the hose 130. In various embodiments, the hose is longitudinally, laterally, and/or rotationally biased to counteract the determined bias in the pipes from the installation state to the operational state so that the hose 130, when in the operational state will also be in its neutral state, thereby improving the ability of the hose 130 to withstand operational forces affecting the temperature-biased system 100. Depending on the layout of the biasing tool 200 and the desired counter-bias, rod assemblies 220 may adjusted in length individually, concurrently, or counter-concurrently (e.g., extending a length of a first rod assembly 220a and simultaneously decreasing a length of a second rod assembly 220b). In some cases, the hose 130 may be pre-attached to one of the first pipe 110 and the second pipe 120 while biasing the hose 130.

Method 600 proceeds to block 650, where the hose 130 is installed between the first pipe 110 and the second pipe 120. In some embodiments, the hose 130 may be installed via bolts, clamps, linkages or the like that secure the hose 130 with a first pipe 110 and a second pipe 120.

Proceeding to block 660, the latches 240, straps 218, or pressure screws 219 of the biasing tool 200 that have captured the hose 130 are released, thus removing the biasing tool 200 from the hose 130. Method 600 may then conclude.

Figure 7:
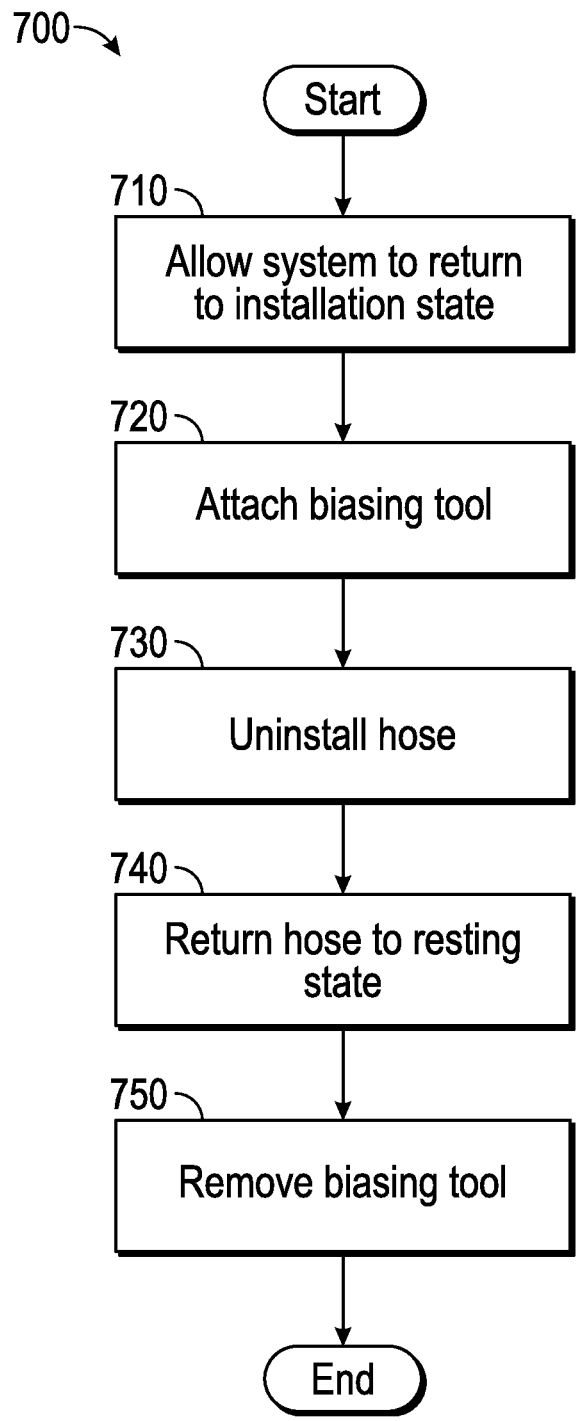
FIG. 7 is a flowchart illustrating operations of an example method for uninstalling a hose with a biasing tool according to embodiments of the present disclosure.

FIG. 7 is a flowchart illustrating operations of an example method 700 for uninstalling a hose 130 with a biasing tool 200 according to embodiments of the present disclosure. Method 700 begins with block 710, where at least a portion of a temperature-biased system 100 in the operational state is allowed to return to an installation state. In various embodiments, any flow of cryogenic fluid may be cut off to one or more pipes that include a hose 130, and the hose 130 and surrounding pipes are allowed to return to an ambient temperature associated with the installation state. In other embodiments, the flow of cryogenic fluid may be cut off to one or more pipes that include a hose 130, and an external heat source applied to those components to shift the components to a controlled temperature associated with the installation state. In yet further embodiments, the hose 130 and surrounding pipes are allowed to return to an installation state, but method 700 may proceed to block 720 before the temperature-biased system 100 reaches the installation state, instead proceeding once an intermediate state that is safe for operator access has been reached.

At block 720 the biasing tool 200 is attached to the hose 130. In various embodiments, depending on the variant of the biasing tool 200 that is used and the variant of the hose 130 that is used, the biasing tool 200 will capture the hose 130 via two or more yokes 210 or two or more collars formed from yokes 210 at various points on the hose 130. The operator attaching the biasing tool 200 may adjust the lengths of the rod assemblies 220 of the biasing tool 200 and engage the latches 240 to allow the first end of the hose 130 and the second end of the hose 130 to be captured.

Proceeding to block 730, the hose 130 is uninstalled from the temperature-biased system 100. In various embodiments, bolts, clamps, linkages or the like that secure the hose 130 with a first pipe 110 and a second pipe 120 are removed. The hose 130 is then removed from between the first pipe 110 and the second pipe 120.

At block 740, the hose 130 is returned to its resting state. The rod assemblies 220 are initially set at lengths and rotations that affect the counter-bias in the hose 130 relative to the bias of the temperature-biased system 100 in its installation state. To return the hose 130 to its neutral state, the lengths of the rod assemblies 220 are adjusted, releasing the bias imparted on the hose 130.

Proceeding to block 750, the latches 240, straps 218, or pressure screws 219 of the biasing tool 200 that have captured the hose 130 are released, thus removing the biasing tool 200 from the hose 130. Method 700 may then conclude.

Several examples and embodiments of the apparatus and methods are disclosed herein that include a variety of components, features, and functionalities. It will be understood that the various examples and embodiments of the apparatus and methods disclosed in the present disclosure may include any of the components, features, and functionalities of any of the other examples and embodiments of the apparatus and methods disclosed in the present disclosure in any combination, and in any order, and all of such possibilities are intended to be within the spirit and scope of the present disclosure.

Having the benefit of the teachings presented in the foregoing description and the associated drawings, many modifications of the disclosed subject matter will become apparent to one skilled in the art to which this disclosure pertains. Therefore, it is to be understood that the disclosure is not to be limited to the specific examples and embodiments provided and that modifications thereof are intended to be within the scope of the appended claims. Moreover, although the foregoing disclosure and the associated drawings describe certain illustrative combinations of elements and/or functions, it will be appreciated that different combinations of elements and/or functions may be realized without departing from the scope of the appended claims.

What is claimed is:

1. A biasing tool, comprising:
    a first yoke having a first rotation point and a second rotation point;
    a second yoke having a third rotation point and a fourth rotation point;
    a third yoke having a fifth rotation point and a sixth rotation point;
    a fourth yoke having a seventh rotation point and an eighth rotation point on an opposite surface from the third rotation point and the fourth rotation point
    a first rod assembly connected to the first yoke at the first rotation point and connected to the second yoke at the fourth rotation point, the first rod assembly having a first length;
    a second rod assembly connected to the first yoke at the second rotation point and connected to the second yoke at the third rotation point, the second rod assembly having a second length independent from the first length, the second rod assembly having a non-parallel arrangement relative to the first rod assembly;
    a third rod assembly connected to the third yoke at the fifth rotation point and connected to the fourth yoke at the eighth rotation point, the third rod assembly having a third length;
    a fourth rod assembly connected to the third yoke at the sixth rotation point and connected to the fourth yoke at the seventh rotation point, the fourth rod assembly having a fourth length;
        wherein the third yoke is matched with the first yoke to form a first collar;
        wherein the fourth yoke is matched with the second yoke to form a second collar;
        wherein the third rod assembly is parallel to the first rod assembly and the third length is matched to the first length; and
    wherein the fourth rod assembly is parallel to the second rod assembly and the fourth length is matched to the second length.

2. The biasing tool of claim 1, further comprising:
    the first collar having a first latch on a first side of the biasing tool and a first hinge on a second side of the biasing tool opposite to the first side; and
    the second collar having a second latch on the first side and a second hinge on the second side.

3. The biasing tool of claim 1, further comprising:
    the first collar having a first latch on a first side of the biasing tool and a second latch on a second side of the biasing tool opposite to the first side; and
    the second collar having a third latch on the first side and a fourth latch on the second side.

4. The biasing tool of claim 1, wherein the first collar defines a first through-hole in a first plane; and wherein the second collar defines a second through-hole in a second plane parallel to the first plane.

5. The biasing tool of claim 4, wherein the first length and the third length are adjustable to laterally bias a hose captured in the first through-hole and the second through-hole.

6. The biasing tool of claim 5, wherein the second length and the fourth length are adjustable to longitudinally bias the hose captured in the first through-hole and the second through-hole.

7. The biasing tool of claim 1, wherein the first rotation point and the fourth rotation point contain movement of the first rod assembly to rotation in a first plane, and wherein the second rotation point and the third rotation point contain movement of the second rod assembly to rotation in a second plane parallel to the first plane.

8. The biasing tool of claim 1, wherein the first yoke includes a first hose grip, and wherein the second yoke includes a second hose grip.

9. The biasing tool of claim 1, further comprising:
    a first sliding yoke connected via a first sliding lug to the first yoke to selectively slide laterally relative to the first yoke, wherein the first sliding lug selectively secures the first sliding yoke to the first yoke to restrict movement of the first sliding yoke; and
    a second sliding yoke connected via a second sliding lug to the second yoke to selectively slide laterally relative to the second yoke, wherein the second sliding lug selectively secures the second sliding yoke to the second yoke to restrict movement of the second sliding yoke.

10. The biasing tool of claim 1, further comprising:
    a first mobile yoke connected via a first pivot to the first yoke;
    a first height lug disposed of in the first yoke in contact with the first mobile yoke, configured to affect a height of a portion of the first mobile yoke relative to the first yoke;
    a second mobile yoke connected via a second pivot to the second yoke; and
    a second height lug disposed of in the second yoke in contact with the second mobile yoke, configured to affect a height of a portion of the second mobile yoke relative to the second yoke.

11. A biasing tool, comprising:
    a first turnbuckle having a first end and a second end;
    a second turnbuckle having a first end and a second end;
    a first collar defining a first through-hole in a first plane and including a first rotation point that rotates in a second plane and a second rotation point rotates in a third plane, wherein the second plane and the third plane are perpendicular to the first plane;
    a second collar defining a second through-hole in a fourth plane parallel to the first plane and including a third rotation point that rotates in the second plane and a fourth rotation point that rotates in the third plane;
    wherein the first end of the first turnbuckle is connected to the first rotation point;
    wherein the second end of the first turnbuckle is connected to the second rotation point;
    wherein the first end of the second turnbuckle is connected to the third rotation point;
    wherein the second end of the second turnbuckle is connected to the fourth rotation point; and
    wherein the first turnbuckle crosses the second turnbuckle.

12. The biasing tool of claim 11, further comprising:
    the first collar further including a fifth rotation point that rotates in a fifth plane and a sixth rotation point rotates in a sixth plane, wherein the fifth plane and the sixth plane are perpendicular to the first plane;
    the second collar further including a seventh rotation point that rotates in the sixth plane and an eighth rotation point rotates in the fifth plane;
    a third turnbuckle having a first end connected to the fifth rotation point and a second end connected to the eighth rotation point, parallel to the first turnbuckle;

a fourth turnbuckle having a first end connected to the sixth rotation point and a second end connected to the seventh rotation point, parallel to the second turnbuckle.

13. The biasing tool of claim 11, further comprising:

the first collar further including a first yoke, a second yoke, and a first latch, the first yoke defining a first portion of the first through-hole and the second yoke defining a second portion of the first through-hole, the first latch securing the first yoke with the second yoke; and the second collar further including a third yoke, a fourth yoke, and a second latch, the third yoke defining a first portion of the second through-hole and the second yoke defining a second portion of the second through-hole, the first latch securing the third yoke with the fourth yoke.

14. A biasing tool, comprising:

a first yoke having a first rotation point and a second rotation point;

a second yoke having a third rotation point and a fourth rotation point;

a third yoke having a fifth rotation point and a sixth rotation point;

a fourth yoke having a seventh rotation point and an eighth rotation point on an opposite surface from the third rotation point and the fourth rotation point;

a first rod assembly connected to the first yoke at the first rotation point and connected to the second yoke at the fourth rotation point, the first rod assembly having a first length;

a second rod assembly connected to the first yoke at the second rotation point and connected to the second yoke at the third rotation point, the second rod assembly having a second length independent from the first length, the second rod assembly having a non-parallel arrangement relative to the first rod assembly;

a third rod assembly connected to the third yoke at the fifth rotation point and connected to the fourth yoke at the seventh rotation point;

a fourth rod assembly connected to the third yoke at the sixth rotation point and connected to the fourth yoke at the eighth rotation point in parallel to the third rod assembly, the fourth rod assembly having a fourth adjustable length;

wherein the third yoke is matched with the first yoke to form a first collar; and wherein the fourth yoke is matched with the second yoke to form a second collar.

15. The biasing tool of claim 14, wherein the first rotation point and the fourth rotation point contain movement of the first rod assembly to rotation in a first plane, and wherein the second rotation point and the third rotation point contain movement of the second rod assembly to rotation in a second plane parallel to the first plane.

16. The biasing tool of claim 14, wherein the first yoke includes a first hose grip, and wherein the second yoke includes a second hose grip.

17. The biasing tool of claim 14, further comprising:

a first sliding yoke connected via a first sliding lug to the first yoke to selectively slide laterally relative to the first yoke, wherein the first sliding lug selectively secures the first sliding yoke to the first yoke to restrict movement of the first sliding yoke; and a second sliding yoke connected via a second sliding lug to the second yoke to selectively slide laterally relative to the second yoke, wherein the second sliding lug selectively secures the second sliding yoke to the second yoke to restrict movement of the second sliding yoke.

18. The biasing tool of claim 14, further comprising:

a first mobile yoke connected via a first pivot to the first yoke;

a first height lug disposed of in the first yoke in contact with the first mobile yoke, configured to affect a height of a portion of the first mobile yoke relative to the first yoke;

a second mobile yoke connected via a second pivot to the second yoke; and a second height lug disposed of in the second yoke in contact with the second mobile yoke, configured to affect a height of a portion of the second mobile yoke relative to the second yoke.

19. The biasing tool of claim 14, further comprising:

the first collar having a first latch on a first side of the biasing tool and a first hinge on a second side of the biasing tool opposite to the first side; and the second collar having a second latch on the first side and a second hinge on the second side.

20. The biasing tool of claim 14, further comprising:

the first collar having a first latch on a first side of the biasing tool and a second latch on a second side of the biasing tool opposite to the first side; and the second collar having a third latch on the first side and a fourth latch on the second side.

* * * * *